United States Patent
Back et al.

(10) Patent No.: US 11,670,295 B2
(45) Date of Patent: Jun. 6, 2023

(54) DEVICE, METHOD, AND PROGRAM FOR ENHANCING OUTPUT CONTENT THROUGH ITERATIVE GENERATION

(71) Applicant: Samsung Electronics Co., Ltd., Suwon-si (KR)

(72) Inventors: Seohyun Back, Suwon-si (KR); Yonghyun Ryu, Suwon-si (KR); Wonho Ryu, Suwon-si (KR); Haejun Lee, Suwon-si (KR); Cheolseung Jung, Suwon-si (KR); Sai Chetan, Suwon-si (KR); Jiyeon Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 17/111,734

(22) Filed: Dec. 4, 2020

(65) Prior Publication Data

US 2021/0174801 A1 Jun. 10, 2021

(30) Foreign Application Priority Data

Dec. 4, 2019 (KR) .................. 10-2019-0160008

(51) Int. Cl.
*G10L 15/22* (2006.01)
*G06T 13/00* (2011.01)
(Continued)

(52) U.S. Cl.
CPC ............. *G10L 15/22* (2013.01); *G06N 3/08* (2013.01); *G06T 13/00* (2013.01); *G10L 15/16* (2013.01);
(Continued)

(58) Field of Classification Search
CPC ..... G10L 15/22; G10L 15/16; G10L 15/1815; G10L 2015/223; G06N 3/08; G06T 13/00
See application file for complete search history.

(56) References Cited

U.S. PATENT DOCUMENTS

2014/0160155 A1* 6/2014 Berkovich .............. G06T 7/187
345/629
2014/0164992 A1* 6/2014 Hogan .................. G06F 40/177
715/800
(Continued)

FOREIGN PATENT DOCUMENTS

CN 104951428 A 9/2015
CN 112542163 A * 3/2021
(Continued)

OTHER PUBLICATIONS

Karpathy et al. "Deep Visual-Semantic Alignments for Generating Image Descriptions"., CVPR2015, computer vision foundation (Year: 2015).*

(Continued)

*Primary Examiner* — Bhavesh M Mehta
*Assistant Examiner* — Darioush Agahi
(74) *Attorney, Agent, or Firm* — Jefferson IP Law, LLP

(57) ABSTRACT

A method of improving output content through iterative generation is provided. The method includes receiving a natural language input, obtaining user intention information based on the natural language input by using a natural language understanding (NLU) model, setting a target area in base content based on a first user input, determining input content based on the user intention information or a second user input, generating output content related to the base content based on the input content, the target area, and the user intention information by using a neural network (NN) model, generating a caption for the output content by using an image captioning model, calculating similarity between text of the natural language input and the generated output content, and iterating generation of the output content based on the similarity.

20 Claims, 19 Drawing Sheets

(51) Int. Cl.
  *G10L 15/16* (2006.01)
  *G06N 3/08* (2023.01)
  *G10L 15/18* (2013.01)

(52) U.S. Cl.
  CPC .... *G10L 15/1815* (2013.01); *G10L 2015/223* (2013.01)

(56) References Cited

U.S. PATENT DOCUMENTS

| | | | |
|---|---|---|---|
| 2014/0289632 | A1 | 9/2014 | Suzuki et al. |
| 2017/0200065 | A1 | 7/2017 | Wang et al. |
| 2018/0376097 | A1 | 12/2018 | Luo et al. |
| 2019/0050129 | A1 | 2/2019 | Jiang |
| 2019/0138511 | A1* | 5/2019 | Margiolas .......... G06F 16/2272 |
| 2019/0138598 | A1* | 5/2019 | Albouyeh ............ G09B 21/006 |
| 2019/0147321 | A1 | 5/2019 | Miyato |
| 2019/0158809 | A1 | 5/2019 | Sasaki |
| 2019/0196698 | A1 | 6/2019 | Cohen et al. |
| 2019/0294702 | A1 | 9/2019 | Wu et al. |
| 2019/0340469 | A1* | 11/2019 | Su ........................... G06N 3/08 |
| 2020/0143481 | A1* | 5/2020 | Brown .................. G06Q 40/08 |
| 2020/0175975 | A1* | 6/2020 | Kong .................. G06F 3/04845 |
| 2020/0380027 | A1* | 12/2020 | Aggarwal .............. G06N 20/00 |
| 2020/0390414 | A1* | 12/2020 | Ikhlef ................... G01T 1/2985 |
| 2022/0084163 | A1* | 3/2022 | Lu ............................ G06T 3/40 |
| 2022/0126864 | A1* | 4/2022 | Moustafa ............ B60W 60/001 |

FOREIGN PATENT DOCUMENTS

| | | |
|---|---|---|
| JP | 3698635 B2 | 9/2005 |
| JP | 3762243 B2 * | 4/2006 |
| KR | 1837286 B1 | 3/2018 |

OTHER PUBLICATIONS

Zhang et al. , "StackGAN: Text to Photo-realistic Image Synthesis with Stacked Generative Adversarial Networks" (Year: 2016).*
CN 112542163A-Translation (Year: 2019).*
JP3762243B2-Translation (Year: 2006).*
Huang et al., Realistic Image Generation using Region-phrase Attention, Feb. 4, 2019.
Zhang et al., StackGAN: Text to Photo-realistic Image Synthesis with Stacked Generative Adversarial Networks, Aug. 5, 2017.
International Search Report dated Mar. 2, 2021, issued in International Patent Application No. PCT/KR2020/017677.
Reed et al., Learning What and Where to Draw, XP055648397, Oct. 7, 2016.
Zhang et al., Text-to-Image Synthesis via Visual-Memory Creative Adversarial Network, XP047486234, Sep. 18, 2018.
El-Nouby et al., Tell, Draw, and Repeat: Generating and modifying images based on continual linguistic instruction, XP081199686, Nov. 24, 2018.
Cheng et al., Sequential Attention GAN for Interactive Image Editing via Dialogue, XP081493146, Dec. 20, 2018.
Extended European Search Report dated Aug. 2, 2022, issued in European Patent Application No. 20895919.7.

* cited by examiner

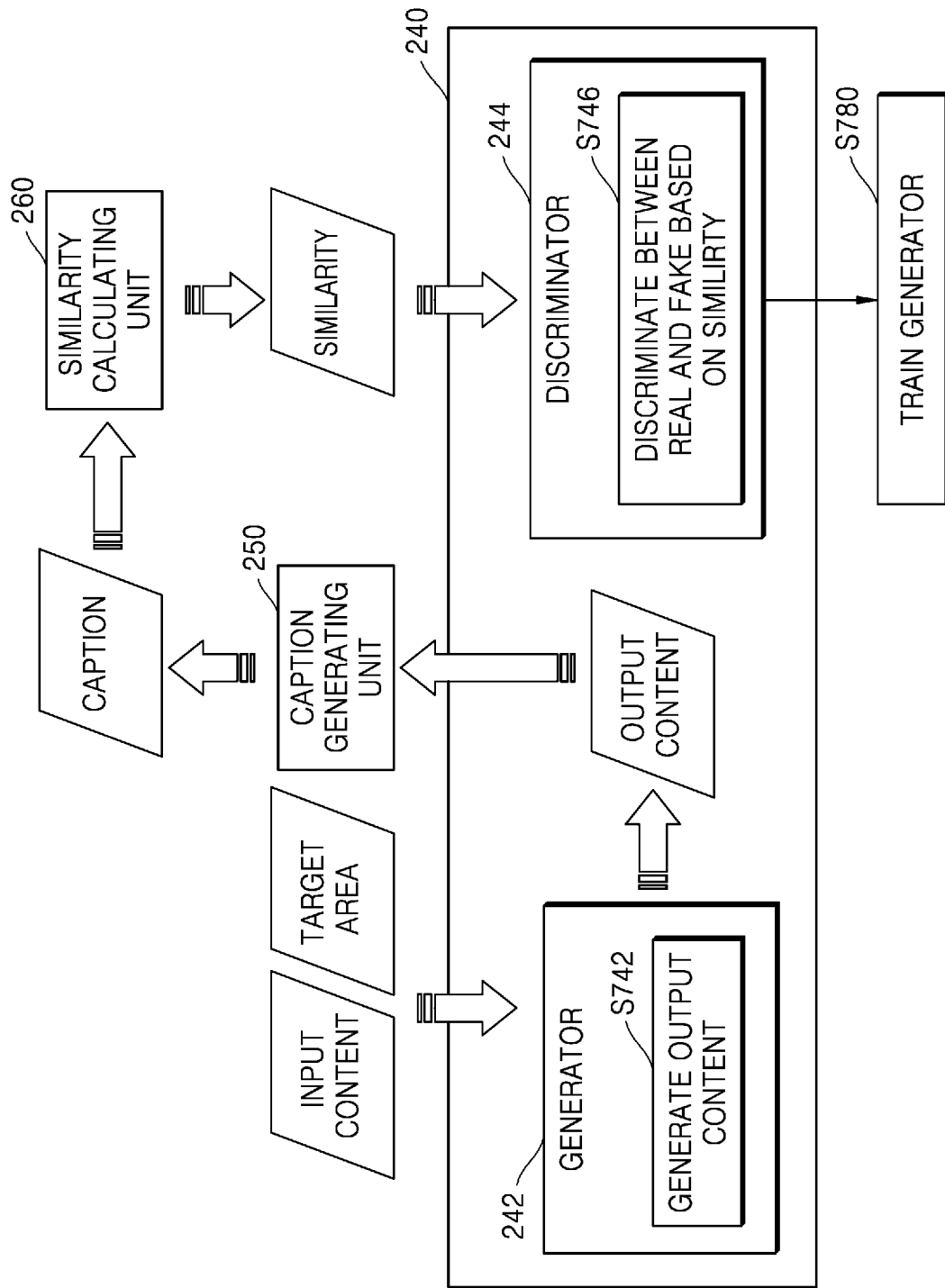

DEVICE, METHOD, AND PROGRAM FOR ENHANCING OUTPUT CONTENT THROUGH ITERATIVE GENERATION

CROSS-REFERENCE TO RELATED APPLICATION

This application is based on and claims priority under 35 U.S.C. § 119(a) of a Korean patent application number 10-2019-0160008, filed on Dec. 4, 2019, in the Korean Intellectual Property Office, the disclosure of which is incorporated by reference herein in its entirety.

BACKGROUND

1. Field

The disclosure relates to an artificial intelligence (AI) system for imitating functions of the human brain such as cognition and judgment by utilizing machine learning algorithms, and applications thereof. More particularly, the disclosure relates to improvement of output content through iterative generation using AI.

2. Description of Related Art

An artificial intelligence (AI) system may refer to a computer system that enables machines to become smart by learning and making decisions on their own, unlike existing rule-based smart systems. The AI system may improve its recognition rates and is capable of understanding a user's preferences more accurately through experience. Thus, existing rule-based smart systems are increasingly being replaced by deep learning-based AI systems.

AI technology may include machine learning (deep learning) and element technologies using machine learning.

Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding refers to technology for recognizing human language/characters for application/processing and includes natural language processing, machine translation, a dialog system, question and answer, speech recognition/synthesis, etc. Visual understanding refers to technology for recognizing and processing an object, in the same way as performed by the human visual system, and includes object recognition, object tracking, image retrieval, person recognition, scene understanding, spatial understanding, image enhancement, etc.

Reasoning/prediction refers to technology for judging information and logically inferring and predicting new information and includes knowledge/probability-based interference, optimization prediction, preference-based planning, recommendations, etc. Knowledge representation refers to technology for automatically processing information about human experience as knowledge data and includes knowledge construction (data generation/classification), knowledge management (data utilization), etc. Motion control refers to technology for controlling autonomous driving of a vehicle and motion of a robot and includes movement control (navigation, collision avoidance, and travelling), manipulation control (action control), etc.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for improvement of output content through iterative generation using AI.

Additional aspects will be set forth in part in the description which follows and, in part, will be apparent from the description, or may be learned by practice of the presented embodiments.

According to an embodiment, content conforming to user intention may be generated.

According to an embodiment, a process of generating content may be improved.

In accordance with an aspect of the disclosure, a device for improving output content through iterative generation is provided. The device includes a memory storing instructions, and at least one processor configured to execute the instructions to receive a natural language input, obtain user intention information based on the natural language input by using a natural language understanding (NLU) model, set a target area in base content based on a first user input, determine input content based on the user intention information or a second user input, generate output content related to the base content based on the input content, the target area, and the user intention information by using a neural network (NN) model, generate a caption for the output content by using an image captioning model, calculate similarity between text of the natural language input and the generated output content, and iterate generation of the output content based on the similarity.

In an embodiment, the base content, the input content, and the output content are images, and the output content is generated by compositing the input content into the target area of the base content.

In an embodiment, the base content includes a plurality of areas, and the target area includes an area selected from among the plurality of areas by the first user input.

In an embodiment, the voice input is converted into the text of the natural language input by using an automatic speech recognition (ASR) model.

In an embodiment, the input content is determined based on content information included in the user intention information.

In an embodiment, the input content is determined from a plurality pieces of content corresponding to the content information.

In an embodiment, the plurality of pieces of content have different attributes from each other.

In an embodiment, an attribute of the input content includes at least one of a pose, facial expression, make-up, hair, apparel, or accessory, and the attribute of the input content is determined based on content attribute information included in the user intention information.

In an embodiment, the NN model is related to a generated adversarial network (GAN) model, and the output content is generated by a generator of the GAN model.

In an embodiment, probability distribution of the output content corresponds probability distribution of real content.

In an embodiment, the base content including the output content has probability distribution approximating to probability distribution of real content.

In an embodiment, the NN model is related to a generated adversarial network (GAN) model, and a discriminator of the GAN model identifies the output content as fake content when the similarity does not satisfy a predetermined condition.

In an embodiment, the output content is a first output content, and the processor is further configured to, when the similarity does not satisfy a predetermined condition, execute the instructions to generate a second output content different from the first output content based on the input content, the target area, and the user intention information by using the NN model.

In an embodiment, the input content is first input content, and the output content is a first output content, and the processor is further configured to, when the similarity does not satisfy a predetermined condition, execute the instructions to determine second input content different from the first input content and generate a second output content different from the first output content based on the second input content and the target area by using the NN model, when the similarity does not satisfy a predetermined condition.

In an embodiment, the processor is further configured to execute the instructions to receive user feedback for a part of the output content, and modify the part of the output content by using the NN model.

In an embodiment, the base content includes a workspace of an application, and the input content includes a work object located in the workspace.

In an embodiment, the output content includes an animation related to the work object, and the animation is generated based on the work object, the user intention information, and an application programming interface (API) of the application.

In an embodiment, the caption for the output content includes a caption for the animation.

In an embodiment, the NLU model, the NN model, and the image captioning model are stored in the memory.

In accordance with another aspect of the disclosure, a method of improving output content through iterative generation is provided. The method includes receiving a natural language input, obtaining user intention information based on the natural language input by using a natural language understanding (NLU) model, setting a target area in base content based on a first user input, determining input content based on the user intention information or a second user input, generating output content related to the base content based on the input content, the target area, and the user intention information by using a neural network (NN) model, generating a caption for the output content by using an image captioning model, calculating similarity between text of the natural language input and the generated output content, and iterating generation of the output content based on the similarity.

In accordance with another aspect of the disclosure, a computer-readable storage medium is provided. The computer-readable storage medium includes instructions which, when executed by at least one processor, causes the at least one processor to receive a natural language input, obtain user intention information based on the natural language input by using a natural language understanding (NLU) model, set a target area in base content based on a first user input, determine input content based on the user intention information or a second user input, generate output content related to the base content based on the input content, the target area, and the user intention information by using a neural network (NN) model, generate a caption for the output content by using an image captioning model, calculate similarity between text of the natural language input and the generated output content, and iterate generation of the output content based on the similarity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7B is a diagram for explaining a method of using a caption according to an embodiment of the disclosure;

The same reference numerals are used to represent the same elements throughout the drawings.

DETAILED DESCRIPTION

Figure 1:
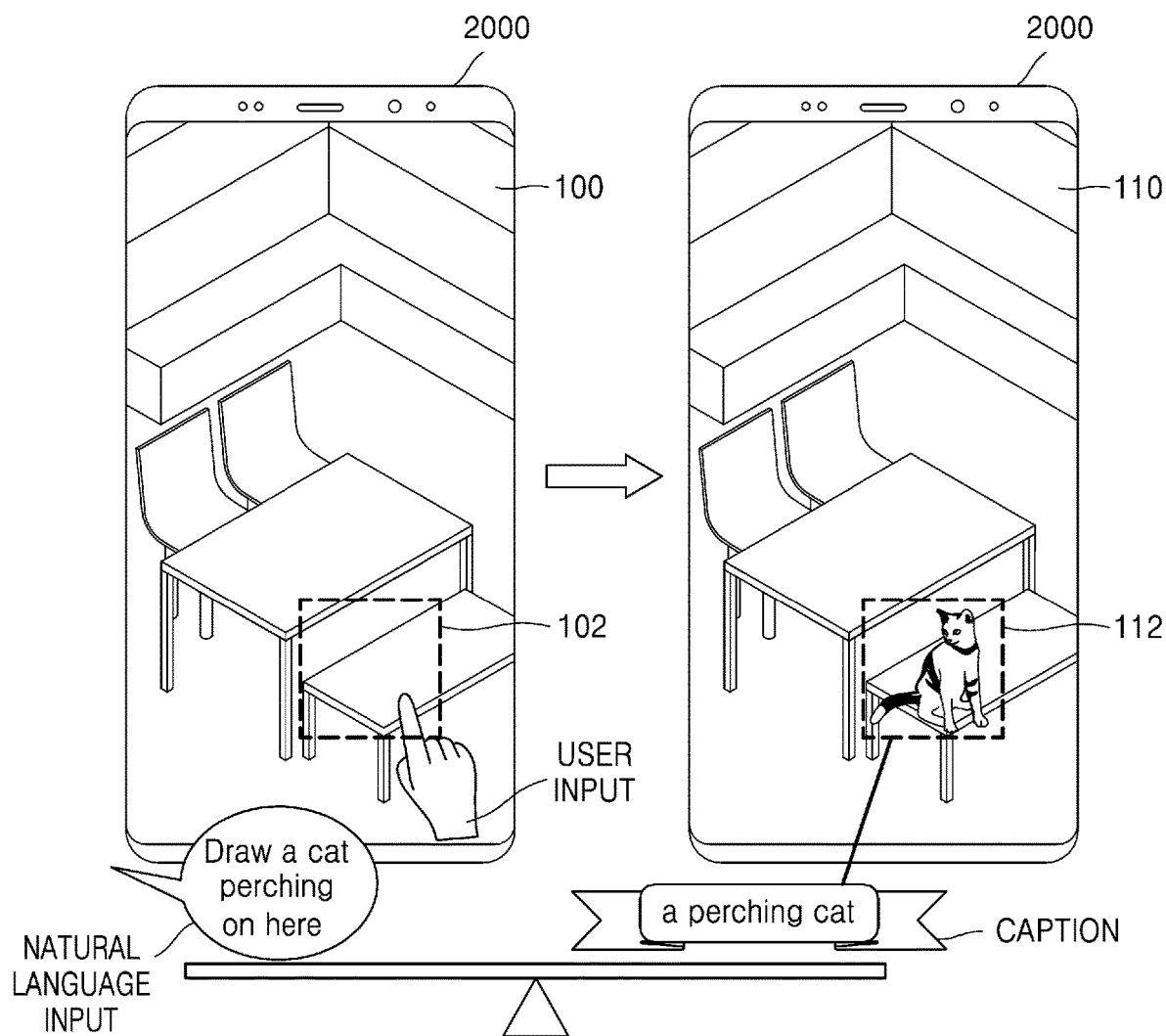
FIG. 1 is a diagram for schematically illustrating iterative generation of content according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a", "an" and "the" include plural referents unless the context clearly dictates otherwise. Thus, for example, reference to "a component surface" includes reference to one or more of such surfaces.

It should be understood that the terms "comprising," "including," and "having" are inclusive and therefore specify the presence of stated features, numbers, operations, components, units, or their combination, but do not preclude the presence or addition of one or more other features, numbers, operations, components, units, or their combination. In particular, numerals are to be understood as examples for the sake of clarity, and are not to be construed as limiting the embodiments by the numbers set forth.

"Content" may be any type of data which may be input in an electronic device, generated by the electronic device, or output at the electronic device. For example, the content may be an image, vector image, video, animation, background, workspace, work object, audio, text, vibration, etc., or their combination. Terms such as, base content, input content, output content, reconstructed content, target content, fake content, real content are used herein to distinguish each content mentioned in each operation of methods according to an embodiment, and their meanings can be easily understood by those skilled in the art based on context. For example, the base content may refer to content which is a subject of edit, modification, compositing, etc. The base content may be a workspace of an application. For example, the base content may be a document which is a workspace of a document editing application, a slide which is a workspace of a presentation editing application, a spreadsheet which is a workspace of a spreadsheet editing application, a user creation mode in a game application, a drawing document of a drawing document of a drawing application. Meanwhile, terms referring to content may refer to content of the same type, for example, images, but is not limited thereto. The terms referring to content may refer to content of different types. For example, the base content may be a workspace, the input content may be an image, and the output content may be an animation of the image.

"User input" refers to any type of input received at an electronic device by a user, and is not limited to an input of a certain user. The user input may be related to one or more coordinates, but is not limited thereto. For example, the user input may be an audio input, voice input, text input, or a combination thereof. An input related to a coordinate may be a touch input, click input, gesture input, etc.

"Natural language input" refers to an input received at the electronic device in the form of language people use every day, and may be a voice input, text input, or a combination thereof.

FIG. 1 is a diagram for schematically explaining iterative generation of content according to an embodiment of the disclosure.

Referring to FIG. 1, an electronic device 2000 may generate output content 112 based on a natural language input and a user input of a user. The output content 112 may be generated by compositing input content onto the base content 100. The base content 100, input content and output content may be images, but are not limited thereto. A specific method of generating the output content 112 may be explained later by referring to FIGS. 7A and 7B.

In an embodiment, the input content used in generation of the output content 112 may be determined based on the natural language input of the user. For example, referring to FIG. 1, an image of a cat or perching cat may be determined as input content based on a natural language input saying "draw a cat perching on here." The input content may be determined from a plurality of pieces of content stored in the electronic device 2000, or determined from images obtained by searching the Internet. A method of determining input content based on a natural language input will be explained by referring to FIG. 5.

Referring to FIG. 1, the output content 112 may be generated in a target area 102 of the base content 100. The output content 112 may be generating by compositing the input content onto the target area 102 of the base content 100 The target area 102 refers to an area of the base content 100 on which the input image is composited. The target area 102 may be an entire area or a partial area of the base content 100. The target area 102 of the base content 110 may include the generated output content after compositing. According to an embodiment, efficiency of a compositing process may be improved by compositing the input content into the target area 102 of the base content 100, because the number of pixels for compositing is decreased compared to when compositing the input content into an entire area of the base content 100.

The target area 102 may correspond to a bounding box including an object detected or localized in the base content 100, such as, a desk, chair, or bench. The base content 100 may include a plurality of areas, such as a plurality of bounding boxes respectively including an object. The target area 102 may be selected from among the plurality of bounding boxes by a user input. A size and shape of the target area 102 may be adjusted by a user input such as a drag input. The target area 102 may have a predetermined size and shape.

Referring to FIG. 1, a caption for the generated output content 112 may be generated. The caption for the generated output content is text for the output content 112, and may be generated by using an image captioning model. The caption may be text for describing the output content 112. In an embodiment, similarity between text of the natural language input and the output content 112 may be calculated. The generated output content 112 may be displayed at the electronic device 2000 based on the similarity. In an embodiment, a process of generation of the output content 112 may be iterated when the similarity does not meet a certain condition. For example, the process of generation of the output content 112 may be iterated by compositing another input content into the target area 102 of the base content 100. For example, the process of generation of the output content 112 may be iterated by compositing the same input content into the target area 102 of the base content 100, which will be explained later by referring to FIGS. 7A and 7B.

According to an embodiment, the process of generation of the output content 112 may be iterated based on the similarity between the text of the natural language input and the caption for the output content 112, so that the generated output content 112 may conform to intention of the user.

Meanwhile, various operations explained in the disclosure such as interpretation of the natural language input the a user, generation of the output content 112, generation of the caption for the output content 112, calculation of the similarity between the text of the natural language input and the caption may be performed by an artificial intelligence (AI) model. The AI model may be referred to as a neural network model. The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Figure 2:
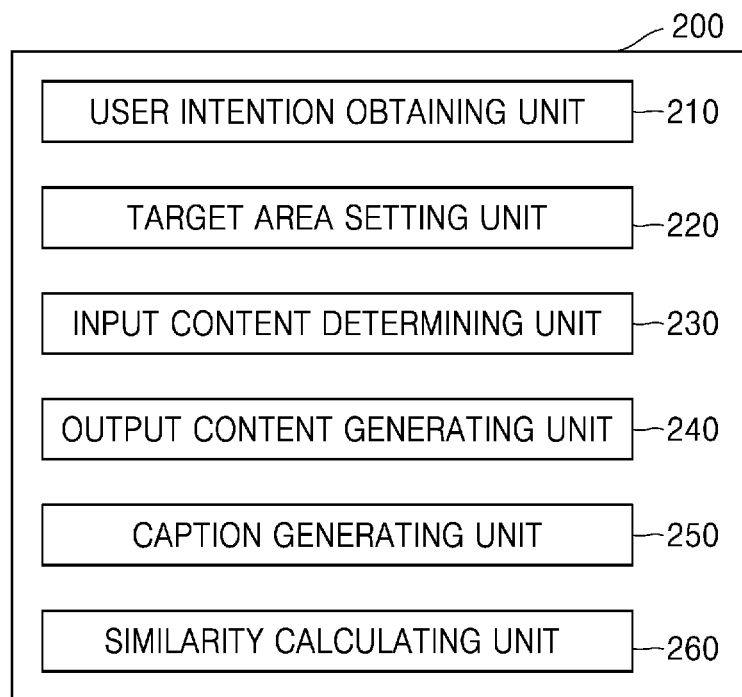
FIG. 2 illustrates a block diagram of an electronic device according to an embodiment of the disclosure.

FIG. 2 illustrates a block diagram of an electronic device according to an embodiment of the disclosure.

The electronic device 200 may include, but are not limited to, a smartphone, a tablet personal computer (PC), a PC, a smart television (TV), a mobile phone, a personal digital assistant (PDA), a laptop, a media player, a micro server, a global positioning system (GPS), an electronic book terminal, a digital broadcasting terminal, a navigation device, a kiosk, an MP3 player, a gateway device, a digital camera, home appliances, and other mobile or non-mobile computing devices, or the like. In addition, the electronic device 200 may be a wearable device such as, for example, and without limitation, a watch, glasses, a hair band, a ring, or the like, having a communication function and a data processing function. However, embodiments of the disclosure are not limited thereto, and the electronic device 200 may include any apparatus capable of generating output content. The electronic device 200 may be an end-user device, but is not limited thereto.

Referring to FIG. 2, the electronic device 200 may include a user intention obtaining unit 210, target area setting unit 220, input content determining unit 230, output content generating unit 240, caption generating unit 250, and similarity calculating unit 260. The electronic device 200 may be implemented by more or fewer components than the components shown in FIG. 2. In the disclosure, modules of the electronic device 200 are named to distinctively explain their operations which are performed by the modules in the electronic device 200. Thus, it should be understood that such operations are performed according to an embodiment and should not be interpreted as limiting a role or a function of the modules. For example, an operation which is described herein as being performed by a certain module of the electronic device 200 may be performed by another module or other modules of the electronic device 200, and an operation which is described herein as being performed by interaction between modules of the electronic device 200 or their interactive processing may be performed by one module of the electronic device 200. Furthermore, an operation which is described herein as being performed by the electronic device 200 may be performed at or with another device to provide substantially same functionality.

Units of the electronic device 200 may be embodied by software modules, and the software modules may be executed by at least one processor to provide functionality of the units. Meanwhile, the software modules may be stored in a memory as a collection of instructions, and the instructions stored in the memory may be executed by the at least one processor. Units of the electronic device 200 may embodied by a hardware module, or a combination of a hardware module and software module. The electronic device 200 may include a memory and a processor.

Each unit of the electronic device 200 will be explained by further referring to FIG. 3.

Figure 3:
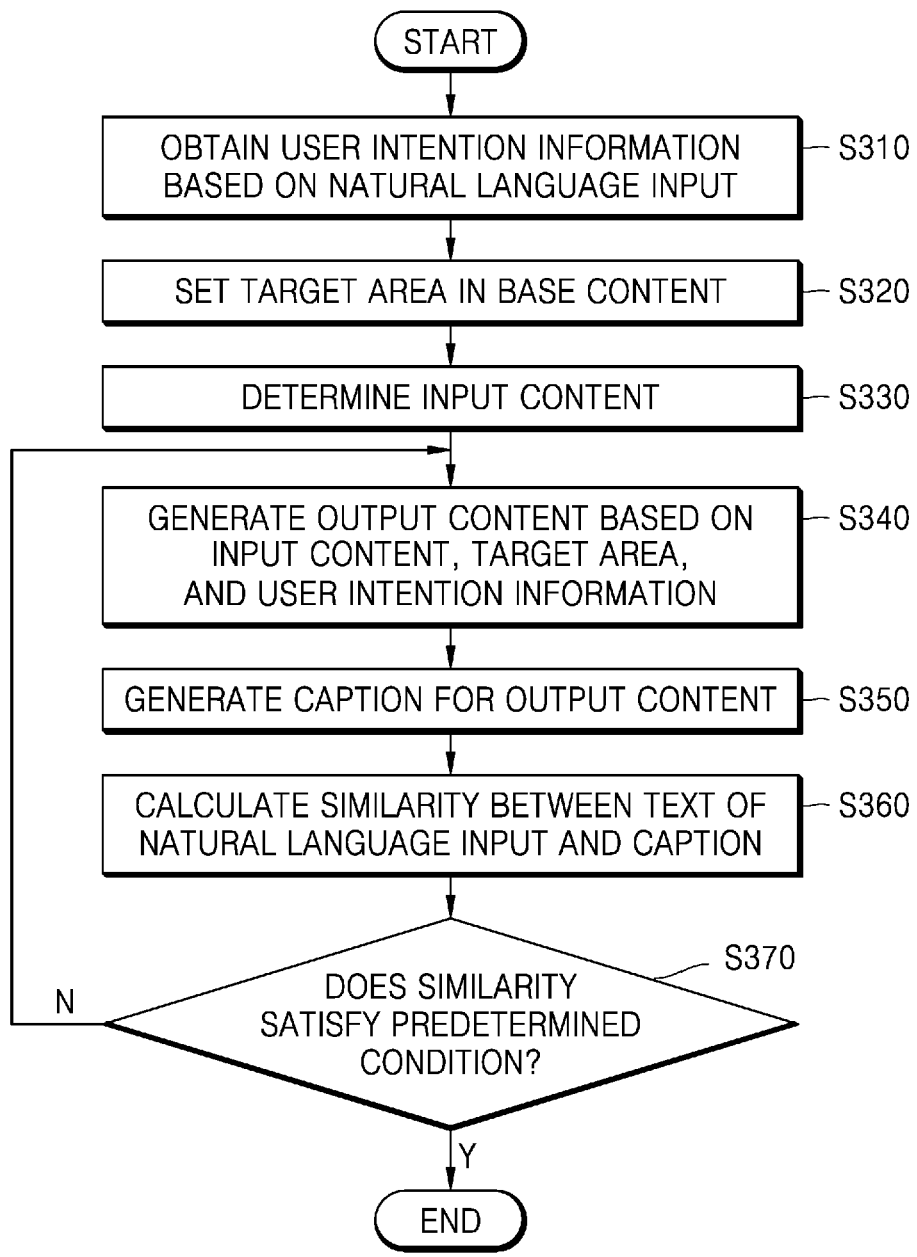
FIG. 3 illustrates a flowchart of a method according to an embodiment of the disclosure.

FIG. 3 illustrates a flowchart of a method according to an embodiment of the disclosure.

Referring to FIG. 3, in operation S310, user intention information may be obtained based on a received natural language input. The user intention obtaining unit 210 of the electronic device 200 may obtain the user intention information based on the received natural language input.

The user intention information may indicate intention of a user interpreted from the natural language input (or its text) of the user by the electronic device 200. The user intention information may include action information regarding an action that can be performed at the electronic device 200. The action information may be inferred a verb in the text of the natural language input. For example, generation of content may be identified as the action information from a verb "draw" of the natural language input saying "draw a cat perching on here." Words indicating the generation of content is not limited to "draw", and may be various. The electronic device 200 may perform an action indicated by the action information. For example, the electronic device 200 may generate output content in response to identifying, from user intention information, action information indicating generation of content. In an embodiment, the user intention information may be obtained by using an AI model, which will be explained later by referring to FIG. 5.

In operation S320, a target area may be set in a base image based on a user input. The target area setting unit 220 of the electronic device 200 may set the target area in the base content based on the user input. The target area may be an entire area or a partial area of the base content. Furthermore, the target area may be an area which can be adjusted in the base content by the user input. The target area may correspond to a bounding box recognized in the base content. In an embodiment, recognition of the bounding box may be performed by an AI model.

In an embodiment, the user input and the natural language input may be received at the electronic device together. For example, when a user touching a displayed base content in the electronic device 200 while speaking, a user input of the touching and a natural language input of the speaking may be simultaneously received at the electronic device.

In operation S330, input content may be determined. The input content determining unit 230 of the electronic device 200 may determine the input content. In an embodiment, the input content may be determined based on the user intention information obtained in operation S320. For example, when the user intention information includes content information, the input content may be determined based on the content information. The content information may be interred from a noun in the text of the natural language input. For example, a noun "cat" may be identified as the content information from the natural language input saying "draw a cat perching on here" In an embodiment, a name of an entity may be identified by using the named entity recognition (NER) as the content information. The electronic device 200 may determine an image of a cat as the input content in response to identifying "cat" as the content information from the text of the natural language input. In an embodiment, the content information may be inferred from an object of the text of the natural language input For example, an object "a cat perching" of a verb "draw" may be identified from the natural language input saying "draw a cat perching on here", and the electronic device 200 may determine an image of a cat as the input content. The input content may be determined from a plurality of pieces of content (such as images) stored in the electronic device 200, or determined from the plurality of pieces of content obtained by searching Internet. The content information may indicate a subject to be input to an AI model to perform an action indicated by the action information.

In an embodiment, the input content may be determined by a user input. For example, content selected by a user at the electronic device 200 may be determined as the input content. A specific method of determining the input content may be explained later by referring to FIGS. 6A and 6B.

Meanwhile, the user intention information may be used to set a target area in the base content according to an embodiment. The user intention information may include area information. An expression indicating a place or location such as "here", "there", "everywhere", "somewhere", a preposition and postposition indicating a location, and any word connected to the preposition and postposition indicating a location may be identified from the text of the natural language input as the area information. In an embodiment, the target area may be set as an area indicated by the area information with respect to a location which may be selected in the base content by a user input. When a bounding box is selected in the base content by the user input, an area indicated by the area information may be set as the target area with respect to the selected bounding box. In an embodiment, the target area may be set in the base content based on the user intention information.

In an embodiment, the user intention information may include content attribute information. For example, when content information corresponding to "cat" is identified from the natural language input saying "draw a cat perching on here", a word "perching" modifying the content information may be identified as the content attribute information indicating an attribute of content, which will be explained later by referring to FIGS. 8, 9, and 10.

In operation S340, output content may be generated based on the input content, the target area, and the user intention information. The output content may be generated in relation with the base content. The output content generating unit 240 of the electronic device 200 may generate the output content based on the input content, the target area, and the user intention information. The output content refers to content generated by the natural language input of the user, and may include content which is output by the electronic device 200 and shown to the user, and may also include content which has been generated but not shown to the user. In an embodiment, the output content may be generated by using an AI model, which will be explained later by referring to FIGS. 7A and 7B.

In operation S350, a caption for the output content may be generated. The caption generating unit 250 of the electronic device 200 may generate the caption for the output content. In an embodiment, the caption for the output content may be generated by using an AI model. For example, the caption for the output content may be generated by using an image captioning model. For example, the caption for an animation of the output content may be generated by using a voice captioning model. Various imaging captioning models and video captioning models are already known by those skilled in the art, thus, redundant explanation is omitted.

In operation S360, similarity between text of the natural language input and the caption may be calculated. The similarity calculating unit 260 of the electronic device 200 may calculate the similarity between the text of the natural language input and the caption. The text of the natural language input may be determined in the process of obtaining the user intention information from the natural language input in operation S310.

In an embodiment, the similarity between the text of the natural language input and the caption may be calculated by using an AI model. The similarity may be vector similarity. The text of the natural language input and the caption may be encoded using semantic vector to generate corresponding vectors, and similarity between the vectors may be calculated.

In operation S370, whether the similarity satisfies a condition may be determined. In an embodiment, when the similarity exceeds a preset threshold, the condition may be satisfied. In an embodiment, when the similarity is within a preset range, the condition may be satisfied.

When the similarity satisfies the condition in operation S370, it may be determined that the generated output content conforms to intention of the user. When the similarity does not satisfy the condition in operation S370, it may be determined that the generated output content does not conform to the intention of the user.

In an embodiment, when the generated output content does not conform to the intention of the user, that is, when the similarity does not satisfy the condition, a process of generating the output content may be iterated in order to generate the output content conforming to the intention of the user. For example, operations S340, S350, S360, and S370 may be iterated.

In an embodiment, when the generated output content does not conform to the intention of the user, that is, when the similarity does not satisfy the condition, another input content different from the input content selected in operation S330 may be determined, and then operations S340, S350, S360, and S370 may be iterated with the newly determined other input content in order to generate the output content conforming to the intention of the user.

According to an embodiment, output content conforming to the intention of the user may be generated by comparing the natural language input of the user and the caption for the output content. Furthermore, the quality of the output content may be improved by iteration of generating the output content.

Figure 4:
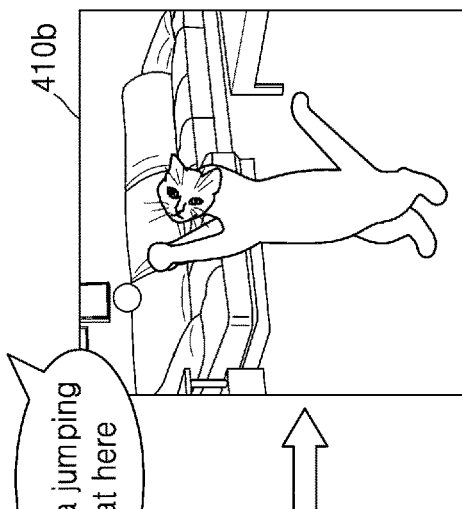
FIG. 4 is a diagram for explaining example content generated according to an embodiment of the disclosure.
Figure 4:
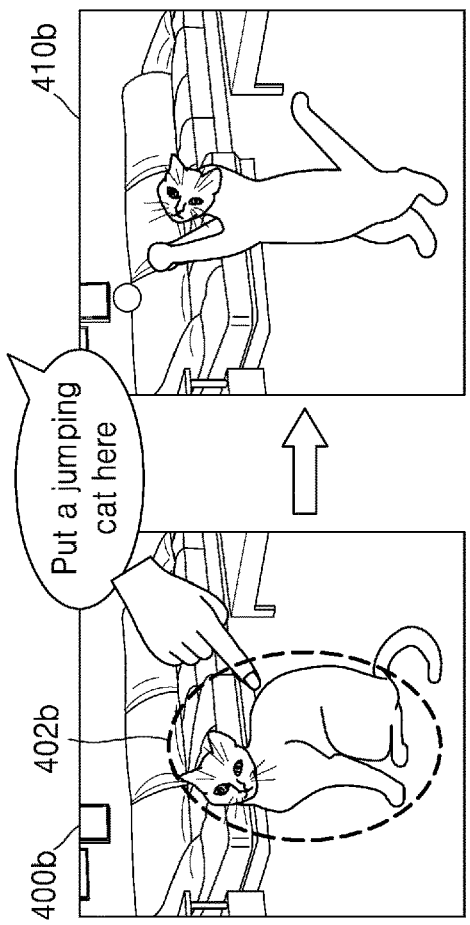
Figure 4:
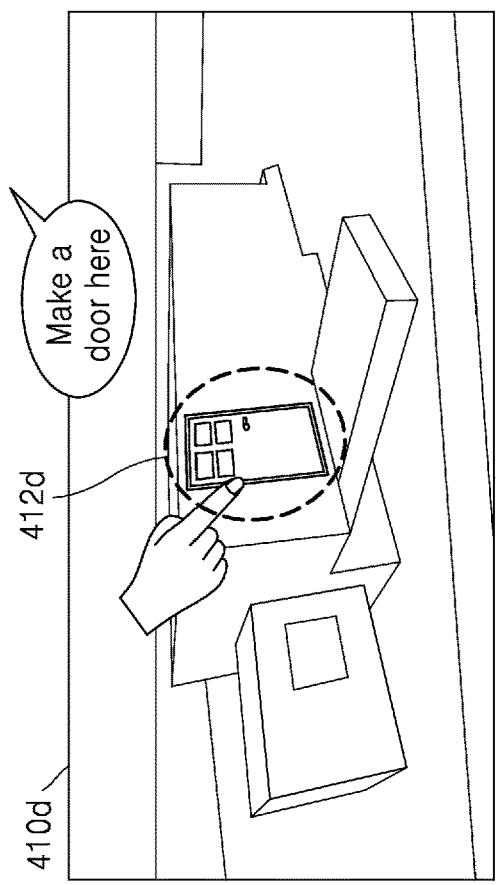
Figure 4:
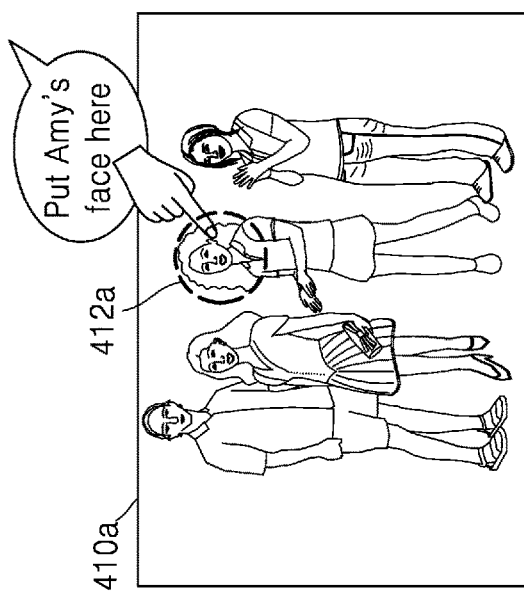
Figure 4:
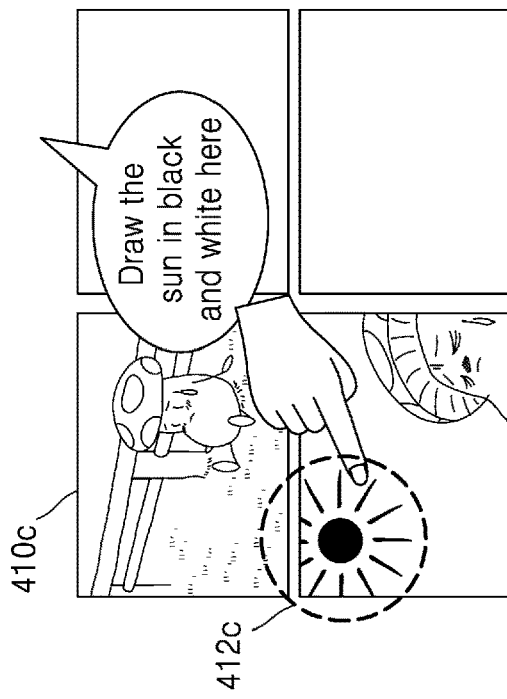

FIG. 4 is a diagram for explaining an example content generated according to an embodiment of the disclosure.

In an embodiment, the target area set in the base content is illustrated as a rectangle in FIG. 1, but is not limited thereto, and may be a circle, oval, triangle, pentagon, polygon, or have any shape.

Referring to FIG. 4, based on a natural language input saying "put Amy's face here" and a target area 412a set by a user input, input content of "Amy's face" may be composited into a target area 412a to generate output content, and then, base content 410a, into which the generated output content is composited, including the composited output content may be provided to the user. The input content may be obtained by searching the Internet.

In an embodiment, the input content may be obtained from images stored in the electronic device or a cloud server by using an AI model. Images captured by the user may be processed in the electronic device or the cloud server by using a face detection AI model, and detected faces may be named directly by the user, or by using a browsing history of social network service (SNS) of the user. Accordingly, a face named as "Amy" may be determined from the detected faces as the input content.

In an embodiment, output content is generated by compositing the input content into the target area 412a of the base content 410a, and then a caption for the generated output content, for example, "Amy's face between friends" may be generated. The caption for the generated output content may be compared to the text of the natural language input, and whether to iterate generation of the output content may be determined based on the comparison.

In an embodiment, a bounding box including a face may be recognized from the base content 410a by using an AI model, the target area 412a may be set based on the recognized bounding box. When a natural language input saying "replace Bell's face with Amy" is received at the electronic device and Bell's face is detected in base content 410a, the Bell's face may be set as a target area 412a.

Referring to FIG. 4, input content 402b of "cat" or "jumping cat" may be composited into a target area based on a natural language input saying "put a jumping cat here" to generate output content. In an embodiment, the input content 402b may be determined from base content 400b by using an AI model. For example, when content information derived from the natural language input corresponds to an object detected in the base content 400b, the detected object may be determined as the input content 402b. In an embodiment, an attribute of the input content 402b detected in the base content 400b may be changed based on user intention information. The user intention information may include content attribute information, and the content attribute information may relate to pose. Furthermore, a pose animation corresponding to a pose indicated by the content attribute information may be obtained. The pose animation of the pose of the content attribute information may be obtained from a pose animation library. The pose animation library may be generated by detecting key points from bodies of animals or people using an AI model.

In an embodiment, the input content 402b may be a pose animation obtained based on the user intention information. The output content may be generated based on an object in the target area and the pose animation by using an AI model. When the base content 400b is a video, each frame of the base content 400b may be modified based on the pose animation to generate the output content, and then the base content 410b including the output content may be provided to a user. A size and shape of the target area may be adjusted according to the pose animation.

In an embodiment, the output content is generated by compositing the input content 402b into the target area of the base content, and then a caption for the generated output content, for example, "a jumping Russian Blue cat" may be generated. The caption for the generated output content may be compared to a text of a received natural language input, and whether to iterate generation of the output content may be determined based on the comparison. An AI model such as a video captioning model may be used to generate the caption for the output content.

In an embodiment, a bounding box including an object may be recognized from the base content 400b by using an AI model, the target area may be set based on the recognized bounding box. The input content 402b may be determined from the bounding box or target area of the base content 400b.

Referring to FIG. 4, when a natural language input saying "draw the sun in black and white here" is received at the electronic device, input content of "sun" or "sun in the black and white" may be composited into a target area 412c to generate output content, and then base content, into which the output content is composited, may be provided to a user.

In an embodiment, the output content may be generated as having the same form with the base content 410c by using an AI model. For example, when the base content 410c is an image of a cartoon type, the output content may be also generated as an image having the same cartoon type. The image of the cartoon type may be a vector image. Output content may be a vector image converted from an image. In an embodiment, the output content may be generated based on commands supported by a vector drawing program. The output content may be generated based on an application programming interface (API) of a program. A method of generating output content based on an API of a program will be explained later by referring to FIGS. 15 and 16. According to an embodiment, output content may be generated in various platform, and not limited to image compositing.

In an embodiment, output content is generated by compositing the input content into the target area 412c of the base content 410a, and then a caption for the generated output content, for example, "black hole" may be generated. The caption for the generated output content may be compared to the text of the natural language input, and whether to iterate generation of the output content may be determined based on the comparison. When the similarity between the caption of the output content and the text of the natural language input of the user does not satisfy a certain condition, a process of generating output content may be iterated. Iterative generation of output content may continue until output content is generated to have a caption similar to the text of the natural language input "the sun in black and white."

Referring to FIG. 4, when a natural language input saying "make a door here" is received at the electronic device, input content of "door" may be composited into the target area 412d to generate output content which matches with the base content 410d, and then the base content 410d including the generated output content may be provided to a user. In an embodiment, the output content may be generated in the same platform with the base content 410d by using an AI model. That is, the output content may be generated as being limited to the platform to which the base content 410d belongs. For example, when the platform of the base content 410d is a certain game, the output content may be generated as a way supported by the game. The game may be a sandbox game or game creating tool. In an embodiment, the output content may be generated based on commands supported by the game. The output content may be generated based on an application programming interface (API) of a game. According to an embodiment, output content may be generated in various platform, and not limited to image compositing.

Figure 5:
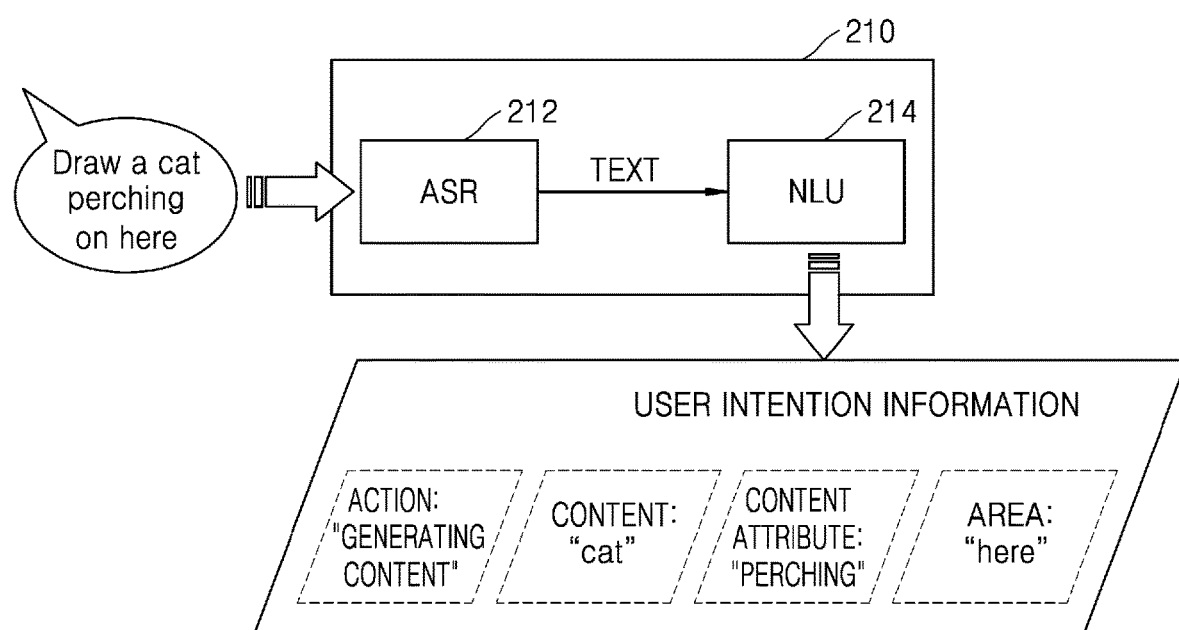
FIG. 5 is a diagram for explaining a method for obtaining user intention information according to an embodiment of the disclosure.

FIG. 5 is a diagram for explaining a method for obtaining user intention information according to an embodiment of the disclosure.

In an embodiment, user intention information may be obtained based on a natural language input of a user.

Referring to FIG. 5, the user intention obtaining unit 210 of the electronic device may include an automatic speech recognition (ASR) model 212 and a natural language understanding (NLU) model 214.

Referring to FIG. 5, when a voice input is received as a natural language input, a voice of the natural voice input may be converted into text through the ASR model 212, and then, the converted text may be processed by the NLU model 214 to obtain the user intention information. The voice input may be received by a microphone of the electronic device. The text converted through the ASR model 212 may be compared with a caption generated for a generated output later, and similarity between the text of the natural language input and the caption for the generated caption may be calculated as a result of the comparison.

In an embodiment, the user intention obtaining unit 210 may include a spoken language understanding (SLU) model, a voice input received through a microphone may be processed by the SLU model to obtain user intention information. In an embodiment, the natural language input may be transmitted from another device.

In an embodiment, when a text input is received as a natural language input, the NLU model 214 may process text of the text input to obtain user intention information. The text input may be received by an input interface of the electronic device such as a keyboard, touch-screen, keypad, etc. In an embodiment, the text input may be transmitted from another device. The text of the text input may be compared with a caption generated for a generated output later and similarity between the text of the natural language input and the caption for the generated caption may be calculated as a result of the comparison.

When a text of a natural language input is input to the NLU model 214, the NLU model 214 may analyze the text to obtain user intention information. The NLU model 214 may obtain action information, content information, content attribute information, and area information, etc., and the obtained information may be used to generate output content. User intention information may be obtained according to various categories in addition to the described information for the electronic device to understand intention of a user FIG. 6A is a flowchart of a method of determining input content according to an embodiment of the disclosure.

Figure 6A:
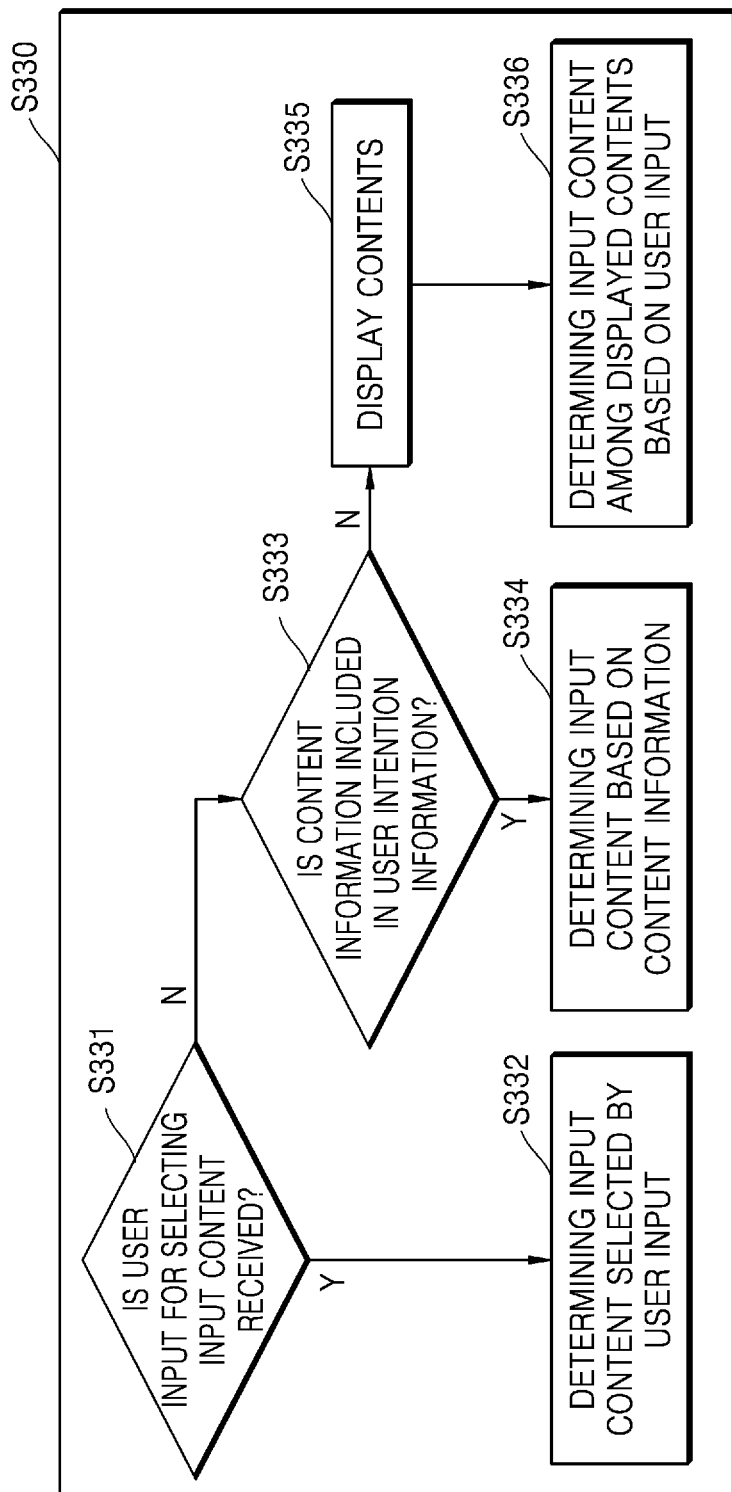
FIG. 6A is a flowchart of a method of determining input content according to an embodiment of the disclosure.
Figure 6B:
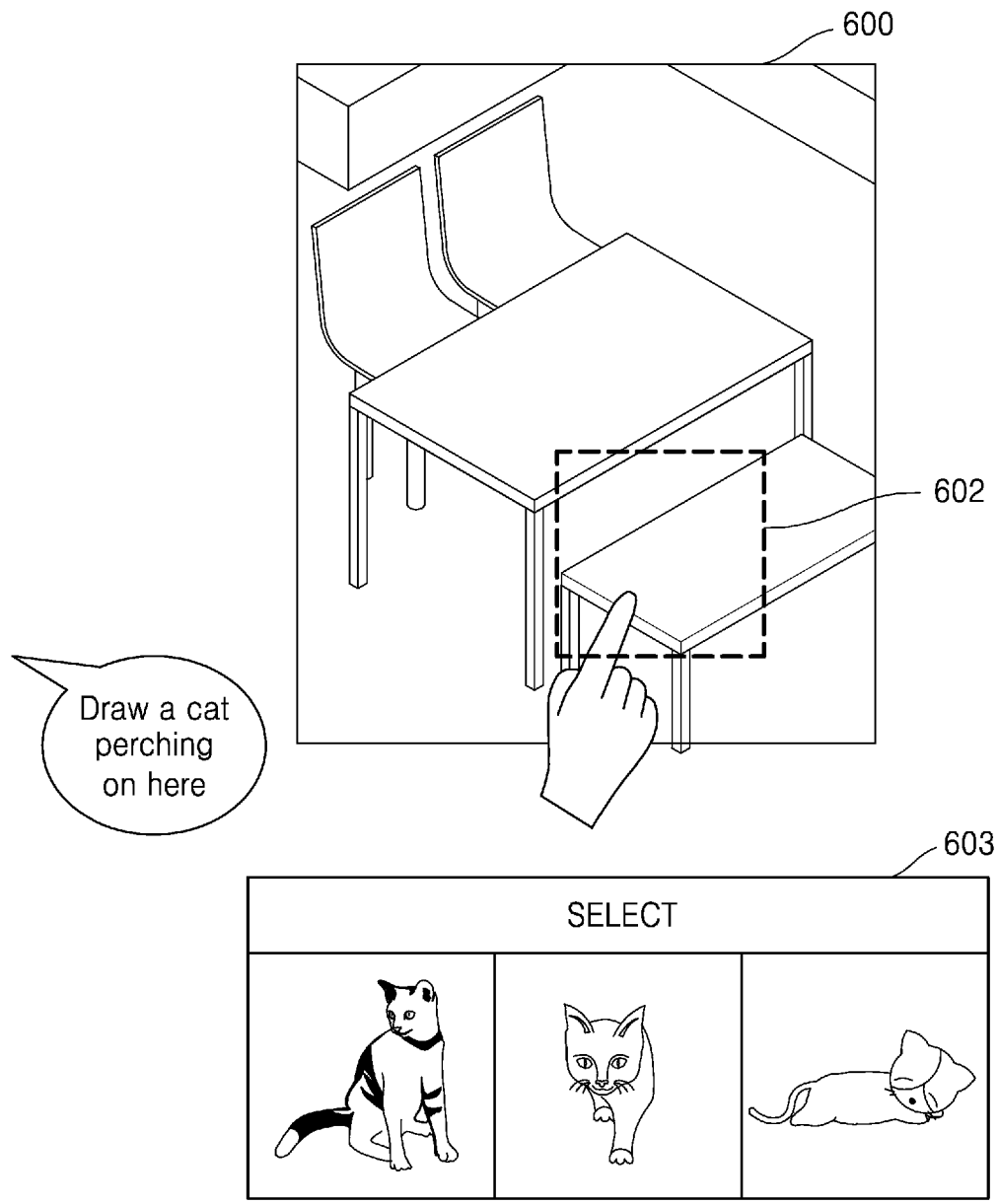
FIG. 6B illustrates an example graphical user interface (GUI) for selection of input content according to an embodiment of the disclosure.

FIG. 6B illustrates an example graphic user interface (GUI) for selection of input content according to an embodiment of the disclosure.

Referring to FIGS. 6A and 6B, an operation S330 of FIG. 3 may be performed differently based on whether a user input for selecting input content is received. The operation S330 may be performed after receiving a user input and a natural language input for selecting a target area 602 in base content 600, but is not limited thereto. For example, the input content may be determined before receiving a user input and a natural language input for selecting a target area 602 in base content 600.

In operation S331, whether a user input of selecting input content is received may be determined. When it is determined that a user input of selecting input content is received in operation S331, content selected by the user input may be determined as the input content in operation S332.

For example, referring to FIG. 6B, a GUI 603 for selecting input content may be displayed on a display of the electronic device, content may be selected from the GUI 603 by a user input as input content.

When it is determined that a user input of selecting input content is not received in operation S331, whether content information is included in user intention information may be determined in operation S333. When it is determined that content information is included in user intention information in operation S333, input content may be determined based on the content information in operation S334. For example, referring to FIG. 6B, when a natural language input saying "draw a cat perching on here" is received, "cat" may be identified as content information, and then the electronic device may determine a cat image as input content in response to identifying "cat" from text of the natural language input as the content information. In an embodiment, input content may be determined based on the content information under confirmation of a user. For example, a found content may be displayed based on the content information, and then the found content may be determined as input content when a user agrees to using the found content as the input content. When a plurality of pieces content are found based on the content information, a GUI 603 for selecting input content among the plurality of pieces of content may be displayed at the electronic device to allow a user to select input content.

When it is determined that content information is not included in user intention information in operation S333, a plurality of pieces of content may be displayed in operation S335. That is, a GUI 603 for selecting input content among the plurality of may be displayed at the electronic device, and then input content may be determined from the plurality of pieces of content based on a user input. The GUI 603 for determining input content may be displayed when content information is not obtained based on a natural language input as well as when content information is not included in user intention information.

Figure 7A:
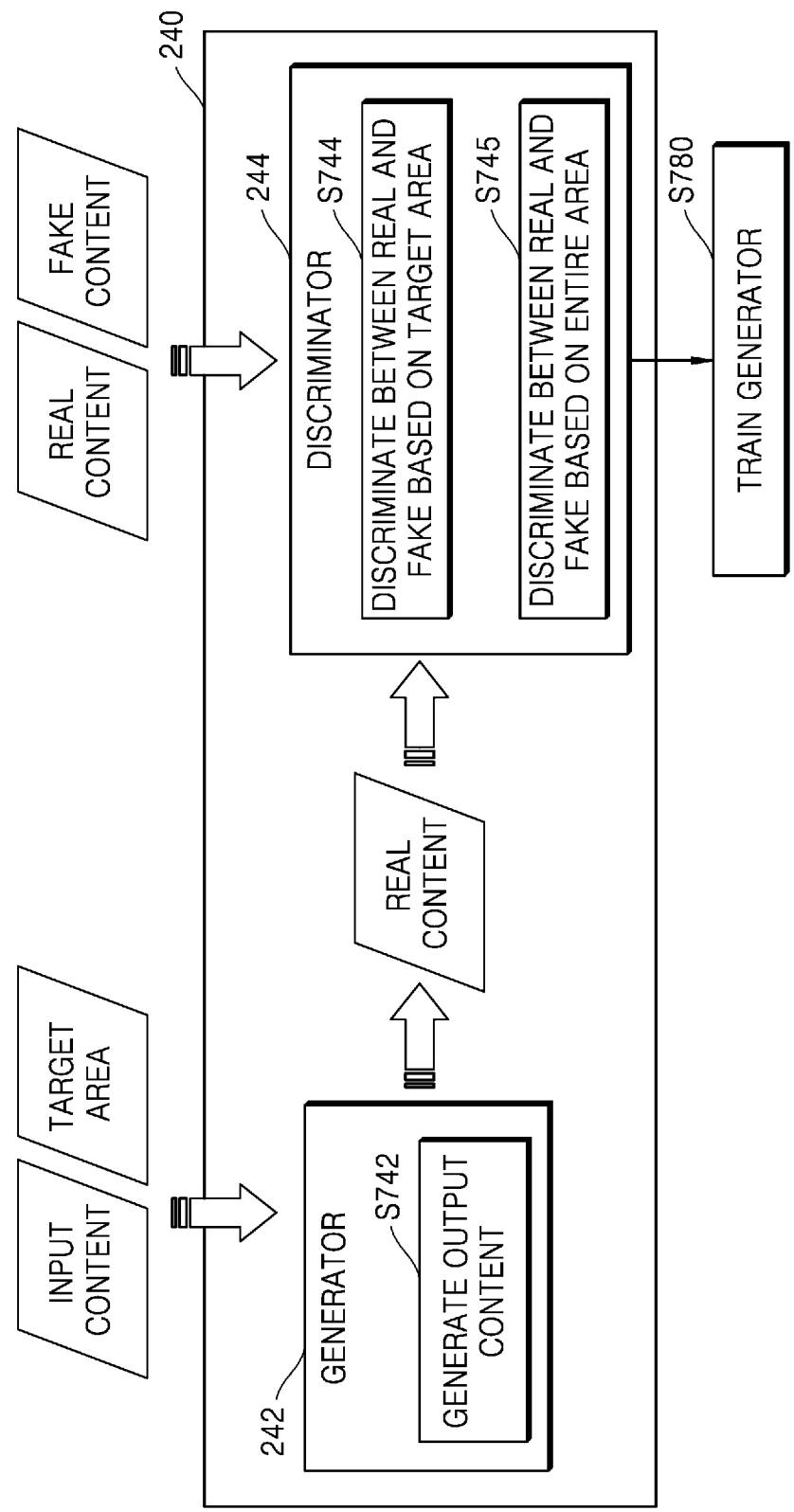
FIG. 7A is a diagram for explaining a generative adversarial network (GAN) according to an embodiment of the disclosure.

FIG. 7A is a diagram for explaining a generative adversarial network (GAN) according to an embodiment of the disclosure.

The output content generating unit 240 may include an AI model for generating output content.

Referring to FIG. 7A, the output content generating unit 240 may include a generative model of the GAN model, that is, a generator 242. The output content generating unit 240 may further include a discriminative model of the GAN model, that is, a discriminator 244. The generator 242 and the discriminator 244 of the GAN model may be adversarially trained with each other. The discriminator 244 may be trained based on real content and fake content in order to determine whether output content generated by the generator 242 is a real or fake content. The generator 242 may generate, based on input data, output content which can be determined as real content by the discriminator 244. The generator 242 and the discriminator 244 may be trained until reaching a balance point. While the two networks reaches the balance point, a loss function of the GAN may be corrected appropriately to be enough to imitate data probability distribution of real content.

The generator 242 may generate output content based on input content and a target area of base content in operation S742. Output content generated by the generator 242 which has reached or approximated to the balance point may have probability distribution approximating to the probability distribution of the real content. The generator 242 may generate output content having probability distribution approximating to the probability distribution of the real content so that the output content is determined as real content by the discriminator 244.

The discriminator 244 may discriminate between a real and fake content with respect to a target area in operation S744. The discriminator 244 may discriminate between a real and fake content with respect to an entire area of base content in operation S745.

The generator 242 may be trained based on a result of discrimination of the discriminator 244 in operation S780. The discriminator 244 is trained to discriminate a real and fake content with respect to the target area and the entire area, and the generator 242 is trained to generate output content which can be determined as real content with respect to the target area and the entire area by the discriminator 244. Accordingly, the quality of the generated output content may be improved.

Referring to FIG. 4, a probability that output content generated by the generator 242 is determined as real content by the discriminator 244 may approximate 0.5, but is not limited thereto. That is, data probability distribution of output content generated by the generator 242 may approximate to data probability distribution of real content. Real content which is used as references to discriminate may have the same form with base content or be supported by the same platform with base content. That is, real content which are collected in the same platform with base content or as having the same form with base content may be used to train the discriminator 244.

FIG. 7B is a diagram for explaining a method of using a caption according to an embodiment of the disclosure.

In an embodiment, the discriminator 244 may be further trained based on similarity between text of a natural language input and a caption for content. After the generator 242 and the discriminator 244 of GAN have reached a balance point, a probability that output content generated by the generator 242 in operation S742 is determined as fake content by the discriminator 244 may approximate to 0.5, but is not limited thereto.

Referring to FIG. 7B, the discriminator 244 may determine whether output content is a real or fake content based on similarity between text of a natural language input and a caption for output content. Particularly, a caption may be generated, by the caption generating unit, for output content which is generated by the generator 242, and similarity between the generated caption and the text of the natural language input of a user may be calculated by the similarity calculation unit. When it is determined that the similarity does not satisfy a predetermined condition in operation S746, the discriminator 244 may determine the generated output content as fake content. When it is determined that the similarity satisfy a predetermined condition in operation S746, the discriminator 244 may determine the generated output content as real content. In an embodiment, the discriminator 244 may be further trained based on the similarity between the text of the natural language input and the caption of the output content. Furthermore, the generator 242 is also trained in operation S780 to generate output content which can be determined as real content by the discriminator 244, the generator 242 may iterate a process of generating output content, which may improve the quality of the output content.

Figure 8:
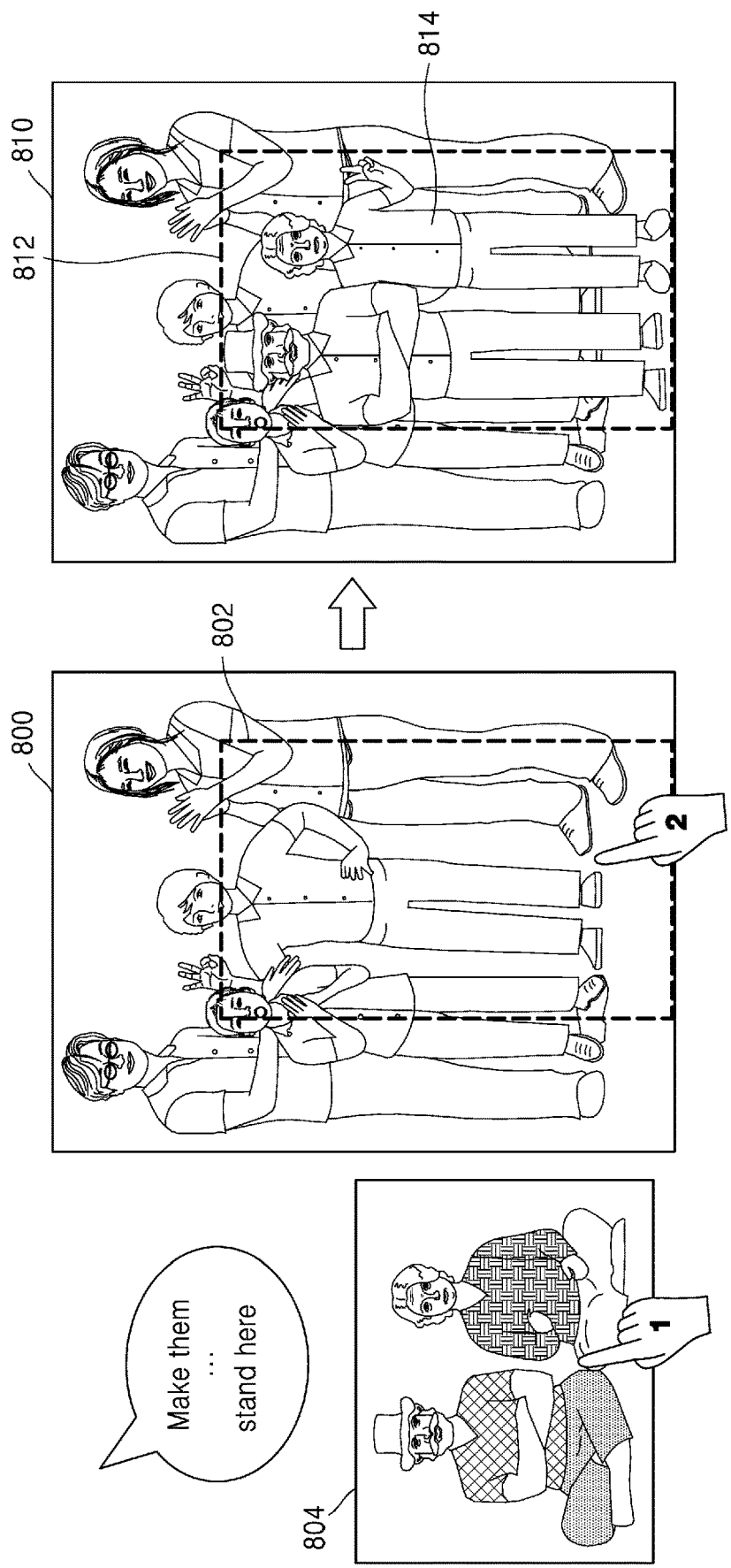
FIG. 8 is a diagram for explaining a method of changing an attribute of input content according to an embodiment of the disclosure.

FIG. 8 is a diagram for explaining a method of changing an attribute of input content according to an embodiment of the disclosure.

Referring to FIG. 8, a picture of parents may be selected as input content 804 by a user input 1. A target area 802 may be set in base content 800 based on a user input 2. When a natural language input saying "make them stand here" is received at the electronic device, the electronic device may obtain user intention information based on the natural language input. In the natural language input, "make" may correspond to action information In the natural language input, "them" may correspond to content information In the natural language input, "stand" modifying the content information may be identified as content attribute information indicating an attribute content.

In an embodiment, the output content 814 may be generated based on the content attribute information. The output content 814 may be generating by compositing the input content into the target area 802 of the base content 800. An attribute of the output content 814 may be identical to an attribute indicated by the content attribute information. An attribute of the output content 814 may be changed from an attribute of the input content 804. An attribute of content may include a pose, facial expression, make-up, hair, apparel, accessory, or style of content, but is not limited thereto. An attribute of content may include a pose, facial expression, make-up, hair, apparel, accessory, or style of an object in content, but is not limited thereto. For example, referring to FIG. 8, an attribute of the input content 804, such as a pose, may be a sitting pose, and an attribute of the output content 814 may be a standing pose. A method of changing an attribute of the input content 804 will be explained later by referring to FIGS. 9 and 10.

In an embodiment, the output content 814 may be generated to match with the base content 800. The output content 814 may be generated as having the same attribute with the base content 800 or an object in the base content 800 by referring to the target area 802 or entire area of the base content 800. For example, referring to FIG. 8, when all objects in the base content 800 wear white clothes, the output content 814 in which objects also wear white clothes may be generated. That is, objects in the input content 804 are wearing clothes of different colors, but the output content 814 in which objects wear white clothes may be generated, and the base content 810 and/or its target area 812 may include the output content 814. For example, referring to FIG. 8, when all objects in the base content 800 stand up, the output content 814 in which objects also stand up may be generated. That is, objects in the input content 804 are sitting on a floor, but the output content 814 in which objects stand up may be generated, and the base content 810 and/or its target area 812 may include the output content 814. A method of making the output content 814 to have the same attribute with the base content 810 will be explained by referring to FIGS. 9 and 10.

Figure 9:
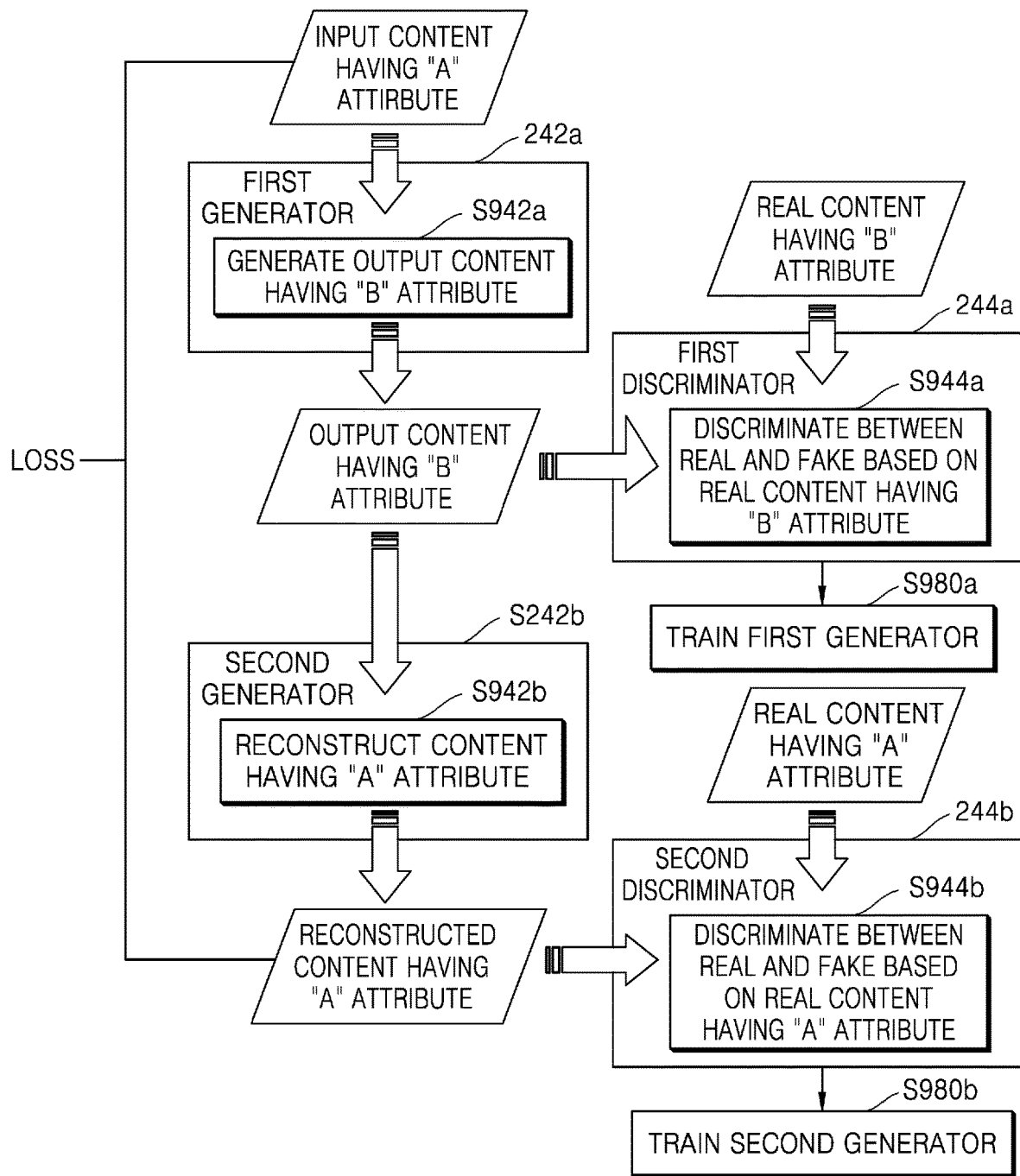
FIG. 9 is a diagram for explaining a method of generating content in a GAN according to an embodiment of the disclosure.

FIG. 9 is a diagram for explaining a method of generating content by a GAN according to an embodiment of the disclosure.

In an embodiment, content attribute information may be obtained from a natural language expression modifying content information. The content attribute information may relate to an attribute that a user wants to change in input content. For example, when input content includes a person, an attribute among a pose, facial expression, make-up, hair, apparel, accessory, or style of the person that a user wants to change may be identified as content attribute information.

Referring to FIG. 9, the output content generating unit may include two generators, that is, a first generator 242a, and a second generator 242b. Furthermore, the output content generating unit may include two discriminators, that is, a first discriminator 244a, and a second discriminator 244b.

The first generator 242a may generate output content having "B" attribute based on input content having "A" attribute in operation S942a. That is, the first generator 242a may generate fake content having "B" attribute based on real content having "A" attribute. The first generator 242a may be trained to generate output content having "B" attribute.

The second generator 242b may reconstruct content having "A" attribute based on the generated output content having "B" attribute in operation S942b. That is, the second generator 242b may reconstruct an original content having "A" attribute from fake content having "B" attribute. The first generator 242a may be trained to generate output content having "A" attribute. The first generator 242a may only change an attribute of the input content, while changes to other attribute are suppressed, from "A" attribute to "B" attribute to generate the output content so that the second generator 242b can reconstruct content similar to the original input content having "A" attribute. According to an embodiment, generation of content unrelated to the original content may be suppressed by reconstructing the original content. As a reconstructed content approximates to input content, a loss value may be reduced, which may be interpreted that cyclic consistency between the input content and the output content is maintained.

Meanwhile, whether the output content having "B" attribute generated by the first generator 242a is a real or fake content may be discriminated by the first discriminator 244a in operation S944a. The first discriminator 244a may be trained by using real content having "B" attribute to discriminate between a real and fake content. The first generator 242a may be trained based on a result of discrimination of the first discriminator 244a in operation S980a.

Whether the content having "A" attribute reconstructed by the second generator 242b is a real or fake content may be discriminated by the second discriminator 244b in operation S944b. The second discriminator 244b may be trained by using real content having "A" attribute to discriminate between a real and fake content. The second generator 242b may be trained based on a result of discrimination of the second discriminator 244b in operation 980b.

According to an embodiment, when an attribute of input content is changed from "A" attribute to "B" attribute, consistency of other attributes may be maintained. According to an embodiment, an attribute of input content may be changed from "A" attribute to "B" attribute without labelling on an attribute of content.

Figure 10:
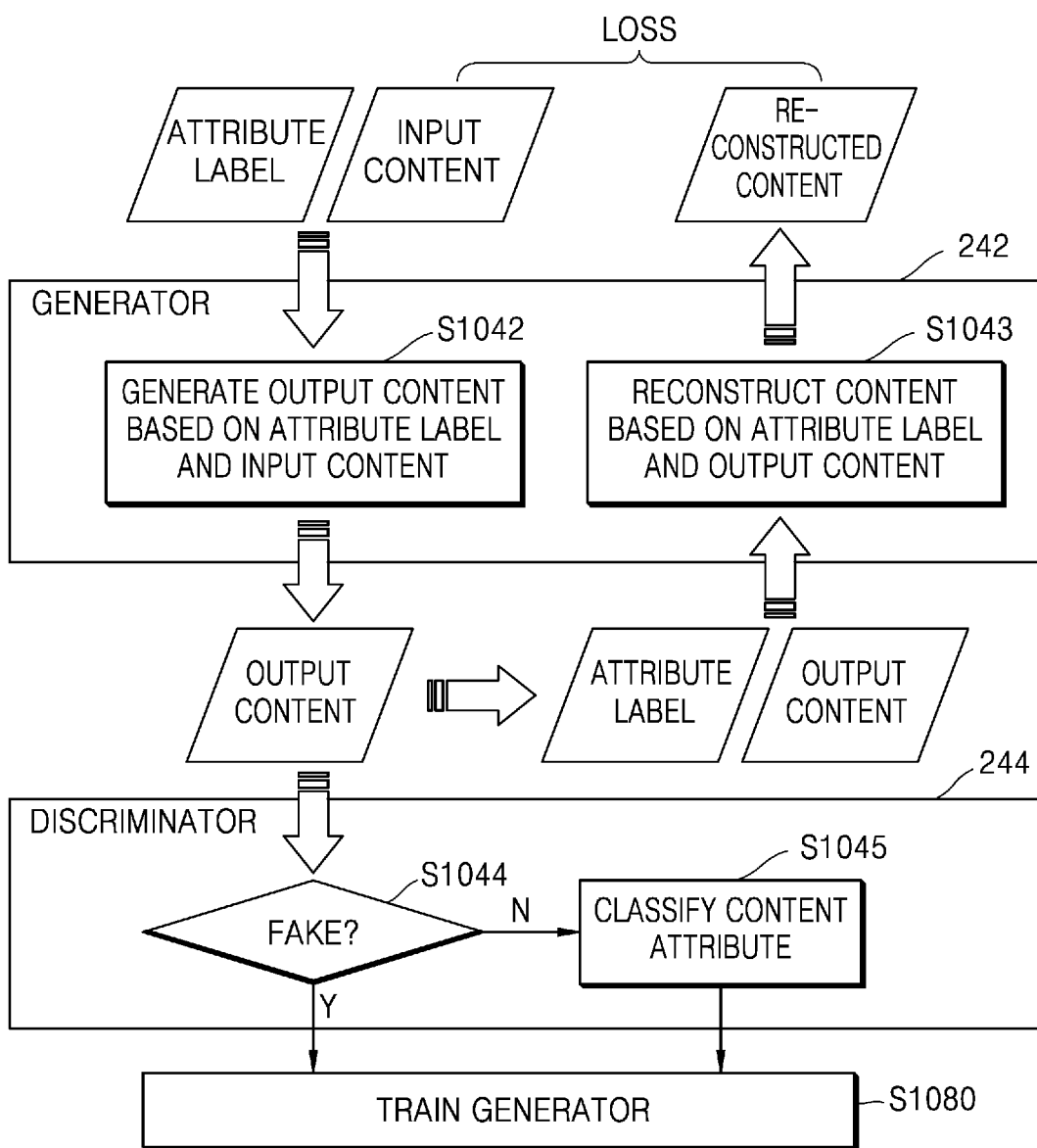
FIG. 10 is a diagram for explaining a method of generating content in a GAN according to an embodiment of the disclosure.

FIG. 10 is a diagram for explaining a method of generating content by a GAN according to an embodiment of the disclosure.

Referring to FIG. 10, the output content generating unit may include a generator 242 and a discriminator 244.

The generator 242 may generate output content based on an attribute label and input content in operation S1042. The attribute label may indicate a label of any attribute which can be classified by the discriminator 244. That is, the generator 242 may receive an attribute label and input content to generate output content. The generator 242 may be trained to generate output content which can be determined by the discriminator 244 as real content and classified to the received attribute label.

The generator 242 may reconstruct content based on the same attribute label with one in operation S1042 and the output content in operation S1043. That is, the generator 242 may receive the initial attribute label and the generated output content to reconstruct content. The generator 242 may modify the input content only to the extent that the generated output content can be classified as the attribute label so that the generator 242 can reconstruct content close to the initial content (the input content). The input content is modified within the extent that the output content can be classified as the attribute label, the output content which is classified to the certain attribute may be generated. As the reconstructed content approximates to the input content, a loss value of the output content may be decreased.

Whether the output content generated by the generator 242 is a real or fake content may be discriminated by the discriminator 244 in operation S1044. When the output content is determined as real content, the discriminator 244 may classify an attribute of the output content in operation S1045. The discriminator 244 may receive real and fake content to discriminate a real or fake content. The discriminator 244 may classify an attribute of the output content, which is determined as real content, to train the discriminator 244.

The generator 242 may be trained based on a result of discrimination of the discriminator 244 in operation S1080.

According to an embodiment, when an attribute of input content is changed from "A" attribute to "B" attribute, consistency of other attributes may be maintained. FIG. 10 is explained with an example of changing only one attribute, but the number of attributes of input content that can be changed may increase according to the number of attributes that the discriminator 244 is configured to classify.

Figure 11:
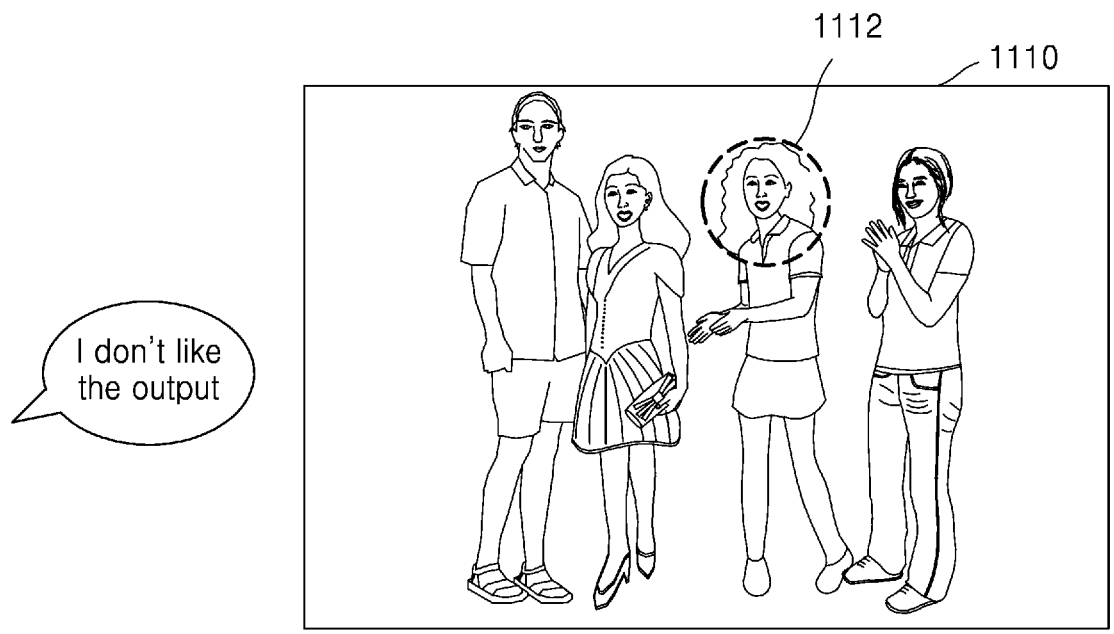
FIG. 11 is a diagram for explaining a method of using a user's feedback according to an embodiment of the disclosure.

FIG. 11 is a diagram for explaining a method of using user feedback according to an embodiment of the disclosure.

Referring to FIG. 11, the electronic device may receive user feedback on base content 1110 into which output content has been composited, output content, or an area of output content corresponding to a target area 1112 of input content. In an embodiment, when user feedback is received, a process of generating output content may be iterated. For example, similar to a case where similarity between a caption of output content and a natural language input does not satisfies a certain condition, a process of generating output content may be iterated when a negative user feedback is received.

According to an embodiment, the user feedback may be reflected on an AI model to provide a more customized result to a user.

Figure 12:
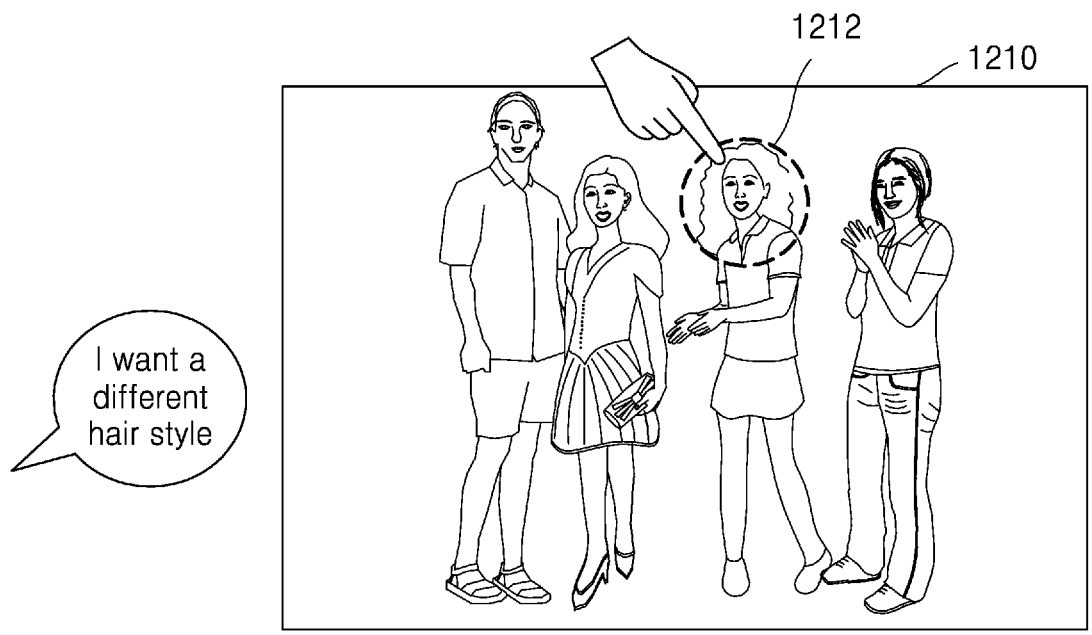
FIG. 12 illustrates an example GUI for receiving a user's feedback according to an embodiment of the disclosure.
Figure 12:
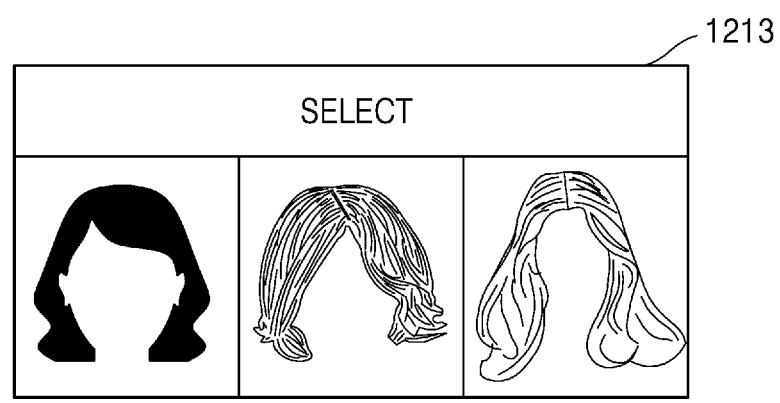

FIG. 12 illustrates an example GUI for receiving a user's feedback according to an embodiment of the disclosure.

Referring to FIG. 12, the electronic device may receive user feedback on base content 1210 into which output content has been composited, output content, or an area 1212 of output content corresponding to a target area 1212 of input content. In an embodiment, when user feedback is received, a GUI 1213 for changing an attribute of an object in input content may be displayed. For example, when a negative user feedback on an attribute of output content is received, the GUI for changing the attribute of the output content may be displayed so that a user may select his or her favorable attribute.

Figure 13:
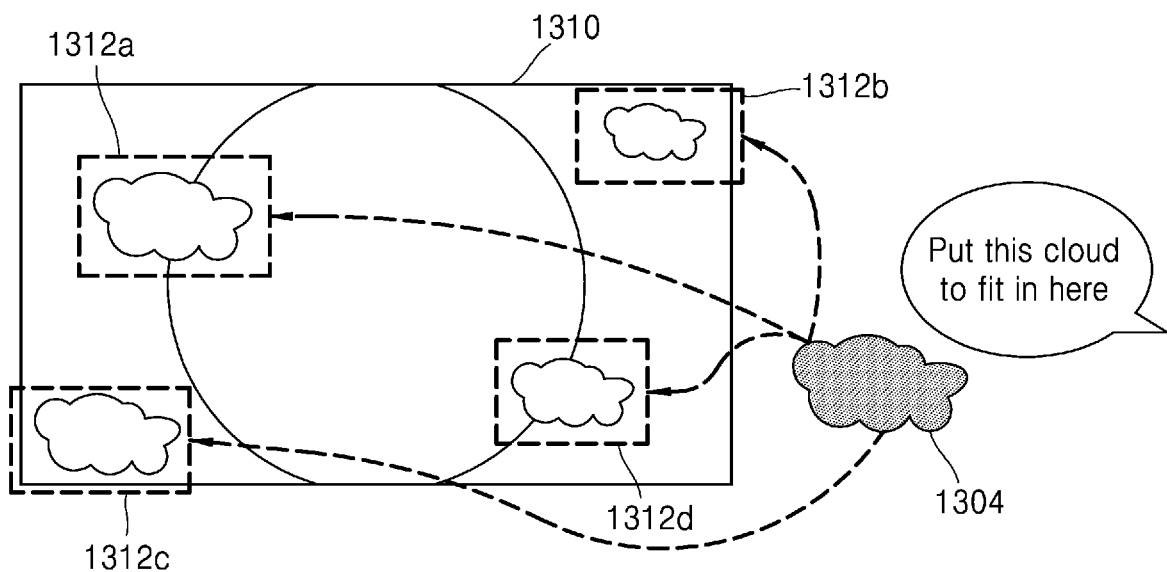
FIG. 13 is a diagram for explaining content generated in a workspace of an application according to an embodiment of the disclosure.

FIG. 13 is a diagram for explaining content generated in a workspace of an application according to an embodiment of the disclosure.

Referring to FIG. 13, content of black cloud is determined as input content 1304, and a natural language input saying "put this cloud to fit in here" may be received at the electronic device. In an embodiment, when user inputs on target areas 1312*a*, 1312*b*, 1312*c* and 1312*d* are received, the electronic device may generate output content in the target area 1312*a*, 1312*b*, 1312*c*, and 1312*d*. The output content may be generated in relation with the base content by using an AI model. As shown in FIG. 13, when a workspace 1310 includes another object, such as a white circle, the output content may be generated in relation with the workspace 1310 including the white circle object Relation between output content and the workspace 1310 may be obtained based on user intention information which is determined from a natural language input. For example, white clouds may be generated as a plurality of pieces of output content (work objects) by referring to the white cloud in the workspace 1310 based on expression of "to fit in here." That is, output content which has a different color from the initial input content 1304 may be generated.

Figure 14:
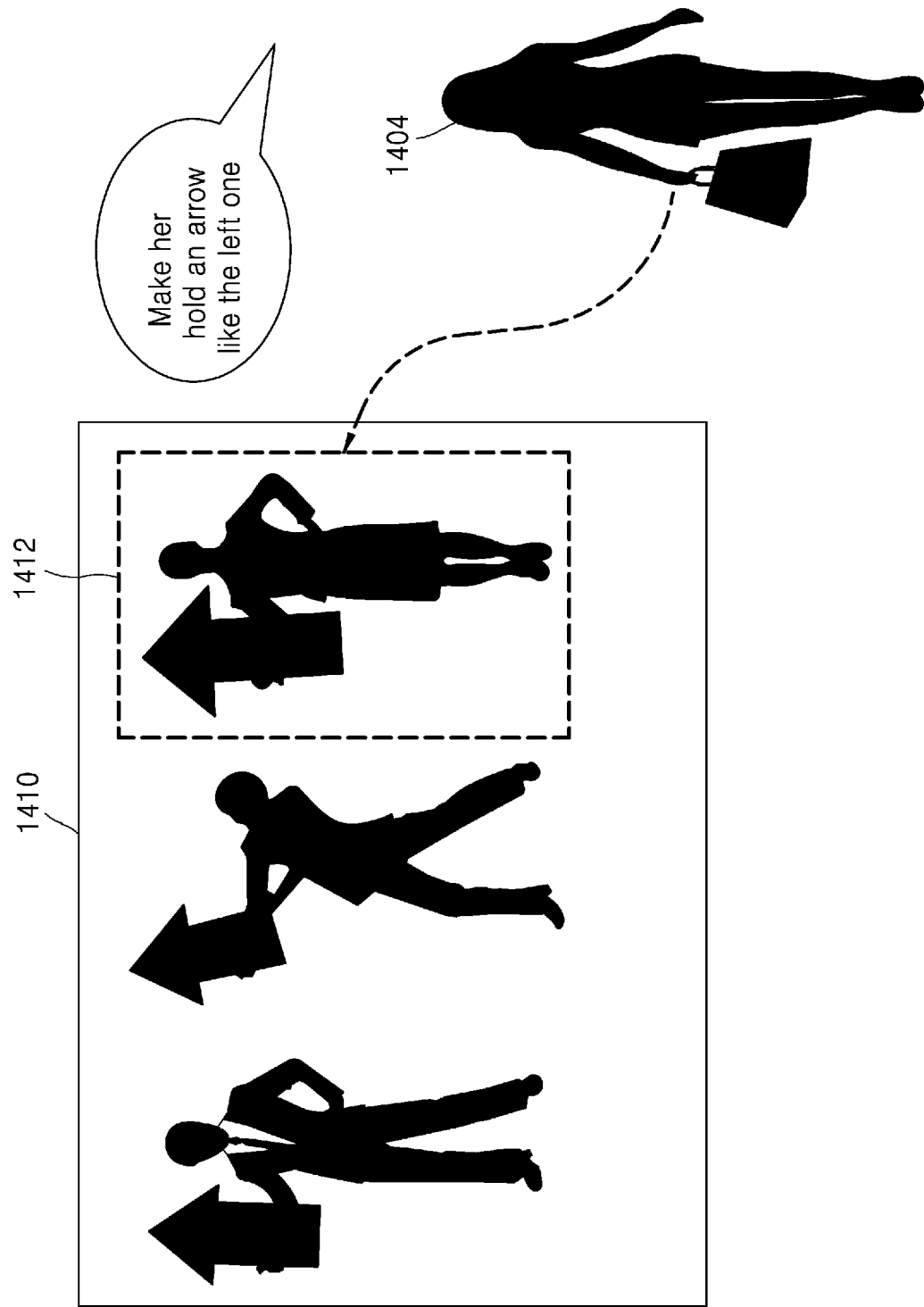
FIG. 14 is a diagram for explaining content generated adaptively to a workspace of an application according to an embodiment of the disclosure.

FIG. 14 is a diagram for explaining content generated adaptively to a workspace of an application according to an embodiment of the disclosure.

Referring to FIG. 14, content of a silhouette of a woman holding a bag is determined as input content 1404, and a natural language input saying "make her hold an arrow like the left one" may be received at the electronic device. When a user input on a target area 1412 is received, the electronic device may generate output content in the target area 1412 by using an AI model.

Referring to FIG. 14, when a workspace 1410 includes another object, such as silhouette of a man holding an arrow, the output content may be generated in relation with the workspace 1410 including the other object. For example, a silhouette of a woman holding an arrow like the man may be generated as output content by referring to the man holding an arrow in the workspace 1410 based on expression of "hold an arrow like the left one."

Figure 15:
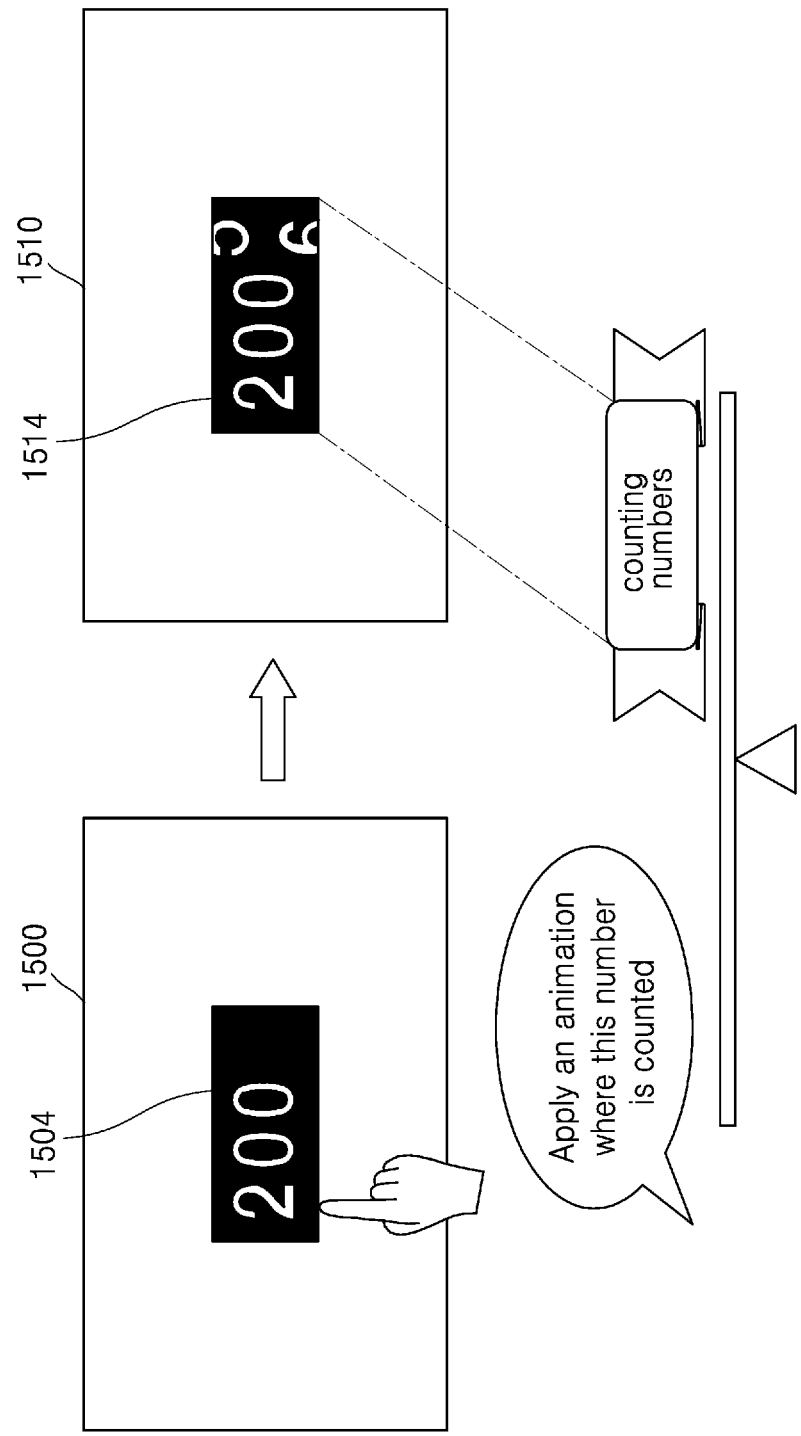
FIG. 15 is a diagram for explaining a method of generating an animation of content according to an embodiment of the disclosure.

FIG. 15 is a diagram for explaining a method of generating an animation of content according to an embodiment of the disclosure.

According to an embodiment, when base content is a workspace of an application, output content may be generated based on an API of the application. The API of the application may call for various commands related to an animation. The commands related to an animation may include commands for setting an action parameter of an animation (such as, appear, highlight, hide, move), a starting point and end point of the action parameter (such as where to appear, where to hide, where to move), a move direction of the action parameter, a move timing of the action parameter, a move speed of the action parameter, etc., but are not limited thereto.

Referring to FIG. 15, output content may be an animation related to input content 1504. The input content 1504 may be a work object.

An animation related to the input content 1504 may be generated by using the above AI model, such as a GAN model. A generator of the GAN model may receive the input content 1504, the API of the application, and user intention information, and then combine commands provided by the API of the application to generate the animation related to the input content 1504, and the animation may animate according to intention of a user.

For example, when input content 1504 is selected in a workspace 1500, and a natural language input saying "apply an animation where this number is counted" is received at the electronic device, a generation of an animation may be identified as action information from "apply an animation." An animation related to the input content 1504 may be generated in response to identifying the action information indicating the generating of the animation. The target area may be an area to which the input content 1504 is located in the workspace 1500, but is not limited thereto. An animation conforming to the intention of the user may be inferred from content attribute information. For example, "this number" may be identified as content information in the natural language input, and "is counted" modifying the content information may be identified as content attribute information. An animation may be generated based on the input content 1504, the API of the application, and the content attribute information of "is counted."

The electronic device may generate a caption for the content 1514 to which the animation is applied. A caption for describing the animation of the content 1514 may be generated by using a video captioning model. A process of generating an animation may be iterated based on similarity between the generated caption and text of a natural language input. Accordingly, an animation conforming to user intention may be generated. According to an embodiment, an animation may be applied to the input content 1504 by using a natural language input, even though a user is not aware of exact commands of the application. An animation of the input content 1504 may function in a presentation mode of the workspace 1510.

Figure 16:
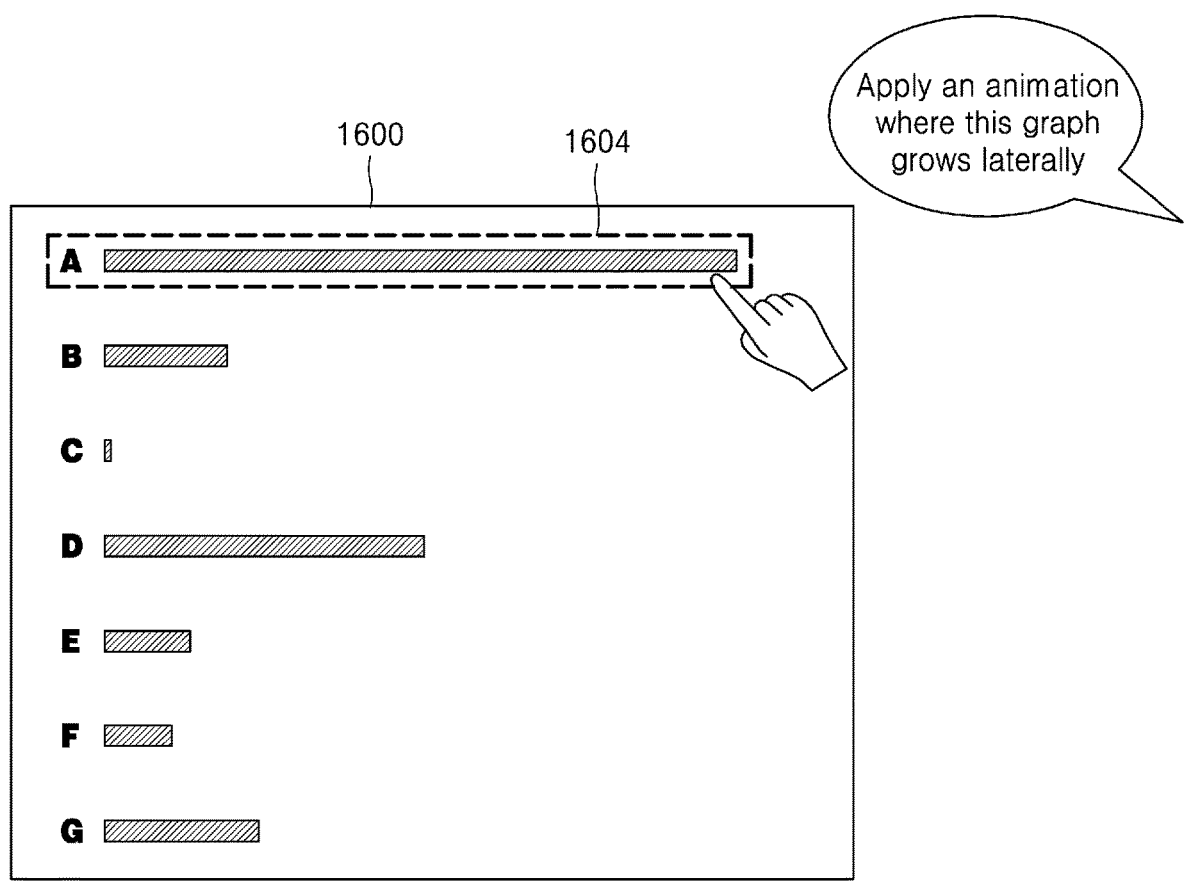
FIG. 16 is a diagram for explaining an example animation generated according to an embodiment of the disclosure.

FIG. 16 is a diagram for explaining an example animation generated according to an embodiment of the disclosure.

Referring to FIG. 16, base content may be a workspace 1600 of an application, and input content 1604 may be a work object. For example, the work object may be created by a tool supported by the application.

When a work object is selected in a workspace 1600, and a natural language input saying "apply an animation where this graph grows laterally" is received at the electronic device, generation of an animation may be identified as action information from "apply an animation." An animation related to the input content 1604 may be generated in response to identifying the action information indicating the generating of the animation. An animation conforming to the intention of the user may be inferred from content attribute information. For example, "this graph" may be identified as content information in the natural language input, and "grows laterally" modifying the content information may be identified as content attribute information. An animation may be generated based on the input content 1604, the API of the application, and the content attribute information of "grows laterally."

Figure 17:
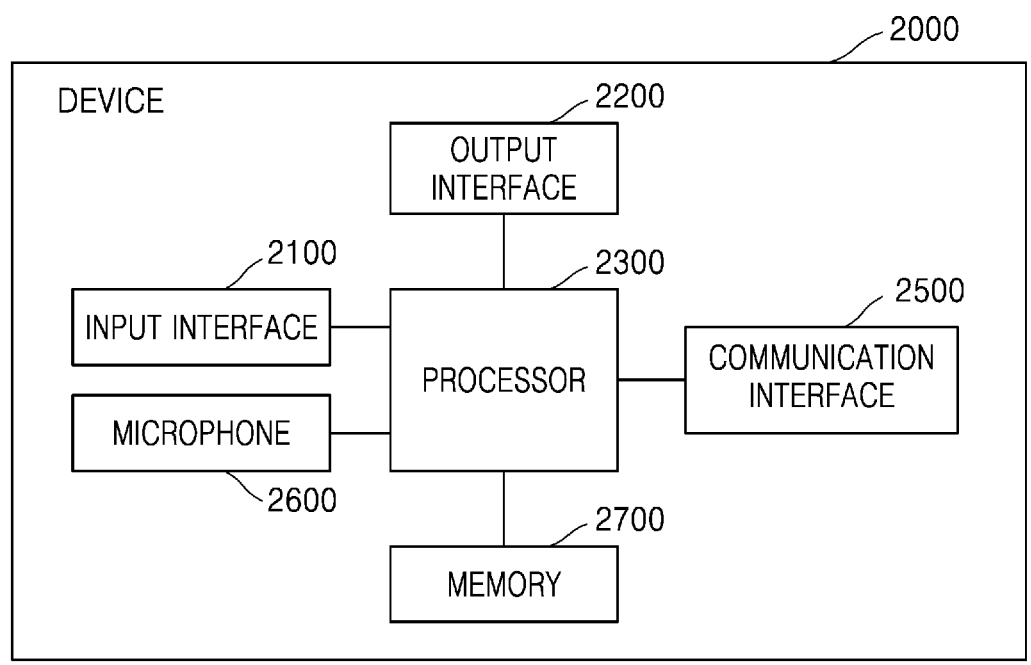
FIG. 17 illustrates an example electronic device according to an embodiment of the disclosure.

FIG. 17 illustrates an example electronic device according to an embodiment of the disclosure.

Referring to FIG. 17, an electronic device 2000 or software running on the electronic device 2000 may perform operations of methods described or illustrated herein to provide functionality described or illustrated herein. The electronic device 2000 may refer to one or more electronic devices 2000. The one or more electronic devices 2000 may perform without substantial spatial or temporal limitation operations of the methods described or illustrated herein. The one or more electronic devices 2000 may perform in real time or in batch mode operations of methods described or illustrated herein.

The electronic device 2000 may include, but are not limited to, a smartphone, a tablet PC, a PC, a smart TV, a mobile phone, a personal digital assistant (PDA), a laptop, a media player, a micro server, a global positioning system (GPS), an electronic book terminal, a digital broadcasting terminal, a navigation device, a kiosk, an MP3 player, a gateway device, a digital camera, home appliances, and other mobile or non-mobile computing devices, or the like.

In addition, the electronic device 2000 may be a wearable device such as, for example, and without limitation, a watch, glasses, a hair band, a ring, or the like, having a communication function and a data processing function. However, embodiments of the disclosure are not limited thereto, and the electronic device 2000 may include any apparatus capable of generating output content. The electronic device 2000 may be an end-user device.

The electronic device 2000 may include a processor 2300 and a memory 2700. Software modules of the electronic device 2000, such as program modules may be stored in the memory 2700 as a collection of instructions, the instructions may be executed by the processor to perform corresponding functions. The electronic device 2000 may be implemented by more or fewer components than the components shown in FIG. 17.

For example, the electronic device 2000 may include an input interface 2100, an output interface 2200, a processor 2300, a communication interface 2500, a microphone 2600, and a memory 2700.

The processor 2300 of the electronic device may include an AI processor for generating a trained network model, but is not limited thereto. The AI processor may be embodied as a chip separate from the processor 2300. The processor 2300 may perform each operation of methods described or illustrated herein.

The input interface 2100 of the electronic device may receive a user input. The input interface 2100 may include a unit for interacting with a user. For example, the user interface 1100 may be a key pad, a dome switch, a touch pad (e.g., contact electrostatic capacitive type, pressure resistive film type, infrared detection type, surface acoustic wave propagation type, integral strain gauge type, piezo-effect type, etc.), a jog wheel, and a jog switch, but not limited thereto.

The output interface 2200 of the electronic device may output information to be provided to a user, such as, an audio signal, video signal, or vibration signal. The output interface 2200 may include a display, a sound output interface, vibration motor, but is not limited thereto.

The sound output interface may output audio data received from the communication interface 2500 or stored in the memory 2700. Furthermore, the sound output interface may output a sound signal (e.g., a call signal reception sound, a message reception sound, a notification sound, etc.) related to a function performed by the electronic device 2000. The sound output interface 2200 may include a speaker, a buzzer, etc.

The vibration motor may output a vibration signal. For example, the vibration motor may output a vibration signal based on outputting audio or video data. The vibration motor may output a vibration signal in response to receiving a touch input.

The output interface 2200 may provide a conversational interface to a user. The conversational interface may be provided in the form of a message window or chatting window, but is not limited thereto.

The communication interface 2500 of the electronic device 2000 may include one or more components which allow the electronic device 2000 to communicate with another device, such as, a server. For example, the communication interface 2500 may include a short-range communication interface, a mobile communication interface, and a broadcast receiver to communicate with a network.

The network may include, for example, and without limitation, a local area network (LAN), a wide area network (WAN), a value added network (VAN), a mobile radio communication network, a satellite communication network, or the like, and any combination thereof. Furthermore, the network may include a data communication network in a comprehensive sense configured to enable smooth communication across network entities shown in FIG. 1 and include, for example, and without limitation, a wired Internet, a wireless Internet, a mobile wireless communication network, or the like. Examples of a wireless communication technology may include, but are not limited to, a wireless LAN (WLAN) or Wi-Fi, Bluetooth, Bluetooth Low Energy (BLE), ZigBee, Wi-Fi Direct (WFD), ultra wideband (UWB), infrared communication (Infrared Data Association (IrDA)), Near Field Communication (NFC), or the like.

The mobile communication interface may communicate a wireless signal with at least one from among a base station, an external terminal, and a server via a mobile communication networks. The wireless signal may include a voice call signal, a video call signal, or any types of data to communicate a text/multimedia message.

The broadcast receiver may receive a broadcasting signal and/or broadcast-related information from the outside via a broadcasting channel. The broadcasting channel may include a satellite channel, a terrestrial channel, etc.

The microphone 2600 may receive and process a sound signal from the outside to convert it to an electronic sound data. For example, the microphone 2600 may receive a sound signal from an external device or a speaker. The microphone 2600 may employ any of various noise-reduction algorithms to reduce noise occurring while receiving a sound signal from the outside.

The memory 2700 may store a program for a process and control, and store input or output data. Programs stored in the memory 2700 may be classified into a plurality of modules.

According to the disclosure, functions related to artificial intelligence (AI) may operate via a processor 2300 and a memory 2700. The processor 2300 may include one or more processors 2300. The one or more processors 2300 may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors 2300 may control input data to be processed according to predefined operation rules or an AI model stored in the memory 2700. When the one or more processors 2300 are a dedicated AI processor 2300, the dedicated AI processor 2300 may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The methods may be performed by hardware, software, or a combination of hardware and software according to an embodiment. When an embodiment is embodied by using software, one or more programs (software, software module) may be used. A program may be included in a computer-readable recording medium, but is not limited thereto. A program may be included in a computer program product. The computer-readable recording medium storing a program may be included in the computer program product. A program may be configured to be executable by one or more processors in the electronic device. The one or more processor may include instructions which, when executed by one or more processors in the electronic device, cause the electronic device to perform the methods according to an embodiment.

A computer readable recording medium may be volatile, non-volatile, or a combination of volatile and non-volatile, where appropriate. The computer readable recording medium may include a computer storage medium and communication medium. The computer-readable recording media may be any available media that can be accessed by a computer and include both volatile and nonvolatile media and both detachable and non-detachable media. Furthermore, the computer-readable recording media may include computer storage media and communication media. The computer storage media include both volatile and nonvolatile and both detachable and non-detachable media implemented by any method or technique for storing information such as computer-readable instructions, data structures, program modules, or other data. The communication media typically embody computer-readable instructions, data structures, or program modules, and include any information transmission media. Embodiments of the disclosure may be implemented through a computer-readable recording medium or a computer program product having recorded thereon computer-executable instructions such as program modules that are executed by a computer. A plurality of computer-readable recording media may be distributed in computer systems which are connected via a network, data stored in the distributed recording media such as instructions and codes may be executed by at least one processor.

Functions of various elements illustrated in drawings may be provided by using not only hardware which is capable of executing related software but also dedicated hardware. When a function is provided by a processor, the function may be provided by a dedicated processor, a single shared processor, or a plurality of individual processors of which a part may be shared.

The term "processor" or "controller" should not be interpreted as only referring to hardware executable of software, and may include a digital signal processor hardware, a read-only memory, random access memory, and volatile storing device for storing software.

In the disclosure, the term such as "-unit" or "-module" should be understood as a unit in which at least one function or operation is processed. A component termed as "-unit" or "-module" may be embodied as hardware, software, or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Operations of all methods described herein can be performed in an appropriate order unless otherwise indicated herein or otherwise clearly contradicted by context, and not limited to the indicated other. The use of any and all examples, or language (e.g., "such as") provided herein, is intended merely to clearly describe the embodiments and does not pose a limitation on the embodiments unless otherwise claimed. For example, each function may be performed in a distributed way or a combined way.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device for improving output content through iterative generation, the device comprising:
   at least one processor; and
   a memory storing instructions which, when executed by the at least one processor, cause the at least one processor to:
   receive a natural language input while displaying base content,
   based on the natural language input, obtain user intention information by using a natural language understanding (NLU) model,
   based on a first user input, set a target area in the base content,
   based on the user intention information or a second user input, determine input content,
   based on the input content, the target area, and the user intention information, generate output content related to the base content by using a neural network (NN) model, the NN model being related to a generated adversarial network (GAN) model,
   generate a caption for the output content by using an image captioning model,
   calculate a similarity between text of the natural language input and the output content, and
   based on the similarity, iterate the generation of the output content,
   wherein the output content comprises first output content, and
   wherein the instructions, when executed by the at least one processor, further cause the at least one processor to:
   in response to the similarity not satisfying a predetermined condition, generate second output content different from the first output content based on the input content, the target area, and the user intention information by using the NN model.

2. The device of claim 1,
   wherein the base content, the input content, and the output content are images, and
   wherein the output content is generated by compositing the input content into the target area of the base content.

3. The device of claim 1,
   wherein the base content comprises a plurality of areas, and
   wherein the target area comprises an area selected by the first user input from among the plurality of areas.

4. The device of claim 1,
   wherein the natural language input comprises a voice input, and
   wherein the voice input is converted into the text of the natural language input by using an automatic speech recognition (ASR) model.

5. The device of claim 1, wherein the input content is determined based on content information included in the user intention information.

6. The device of claim 5,
wherein the input content is further determined from a plurality of pieces of content corresponding to the content information, and
wherein the plurality of pieces of content have different attributes from each other.

7. The device of claim 1,
wherein an attribute of the input content comprises at least one of a pose, a facial expression, make-up, hair, apparel, or an accessory, and
wherein the attribute of the input content is determined based on content attribute information included in the user intention information.

8. The device of claim 1, wherein the output content is generated by a generator of the GAN model.

9. The device of claim 1, wherein a probability distribution of the output content or the base content including the output content corresponds to a probability distribution of real content.

10. The device of claim 1, wherein a discriminator of the GAN model identifies the output content as fake content based on the similarity not satisfying a predetermined condition.

11. The device of claim 1,
wherein the input content comprises first input content, and
wherein the instructions, when executed by the at least one processor, further cause the at least one processor to:
in response to the similarity not satisfying a predetermined condition, determine second input content different from the first input content and generate the second output content based on the second input content and the target area by using the NN model.

12. The device of claim 1, wherein the instructions, when executed by the at least one processor, further cause the at least one processor to:
receive user feedback regarding a part of the output content, and
modify the part of the output content by using the NN model.

13. The device of claim 1,
wherein the base content comprises a workspace of an application, and
wherein the input content comprises a work object located in the workspace.

14. The device of claim 13,
wherein the output content comprises animation related to the work object,
wherein the animation is generated based on the work object, the user intention information, and an application programming interface (API) of the application, and
wherein the caption for the output content comprises a caption for the animation.

15. The device of claim 1, wherein the NLU model, the NN model, and the image captioning model are stored in the memory.

16. The device of claim 1, wherein the iterative generation of the output content continues until the output content is generated having the caption similar to the text of the natural language input.

17. The device of claim 1,
wherein the similarity comprises a vector similarity, and
wherein the text of the natural language input and the caption is encoded using a semantic vector to generate corresponding vectors, and a similarity between the vectors is calculated.

18. A method of improving output content through iterative generation, the method comprising:
receiving a natural language input while displaying base content;
based on the natural language input, obtaining user intention information by using a natural language understanding (NLU) model;
based on a first user input, setting a target area in the base content;
based on the user intention information or a second user input, determining input content;
based on the input content, the target area, and the user intention information, generating output content related to the base content by using a neural network (NN) model, the NN model being related to a generated adversarial network (GAN) model;
generating a caption for the output content by using an image captioning model;
calculating a similarity between text of the natural language input and the generated output content; and
based on the similarity, iterating the generation of the output content,
wherein the output content comprises first output content, and
wherein the method further comprises:
in response to the similarity not satisfying a predetermined condition, generating second output content different from the first output content based on the input content, the target area, and the user intention information by using the NN model.

19. A non-transitory computer-readable storage medium comprising instructions which, when executed by at least one processor, cause the at least one processor to:
receive a natural language input while displaying base content;
based on the natural language input, obtain user intention information by using a natural language understanding (NLU) model;
based on a first user input, set a target area in the base content;
based on the user intention information or a second user input, determine input content;
based on the input content, the target area, and the user intention information, generate output content related to the base content by using a neural network (NN) model, the NN model being related to a generated adversarial network (GAN) model;
generate a caption for the output content by using an image captioning model;
calculate a similarity between text of the natural language input and the generated output content; and
based on the similarity, iterate the generation of the output content,
wherein the output content comprises first output content, and
wherein the instructions, when executed by the at least one processor, further cause the at least one processor to:
in response to the similarity not satisfying a predetermined condition, generate second output content different from the first output content based on the input content, the target area, and the user intention information by using the NN model.

20. The device of claim 1,
wherein the target area is set by the first user input comprising a touch input being applied to the base content, and
wherein the target area corresponds to a bounding box including an object localized in the base content.

\* \* \* \* \*